(12) United States Patent
Seidman et al.

(10) Patent No.: US 12,293,123 B2
(45) Date of Patent: May 6, 2025

(54) SYSTEM AND METHOD FOR MULTIPLE DISPLAYS CONNECTED TO A CLOUD DESKTOP

(71) Applicant: Workspot, Inc., Campbell, CA (US)

(72) Inventors: Edward A. Seidman, Rochester, NY (US); Sarang Karandikar, Cupertino, CA (US); Satyanarayana Chebrolu, Telangana (IN); Timothy H. Root, Santa Cruz, CA (US); Amitabh Bhuvangyan Sinha, San Jose, CA (US); Jimmy Chang, Mountain View, CA (US)

(73) Assignee: Workspot, Inc., Campbell, CA (US)

( * ) Notice: Subject to any disclaimer, the term of this patent is extended or adjusted under 35 U.S.C. 154(b) by 0 days.

(21) Appl. No.: 18/447,184

(22) Filed: Aug. 9, 2023

(65) Prior Publication Data

US 2024/0296006 A1    Sep. 5, 2024

Related U.S. Application Data

(60) Provisional application No. 63/488,097, filed on Mar. 2, 2023.

(51) Int. Cl.
| | |
|---|---|
| *G06F 9/455* | (2018.01) |
| *G06F 3/14* | (2006.01) |
| *G06F 9/451* | (2018.01) |
| *G06F 15/16* | (2006.01) |

(52) U.S. Cl.
CPC .......... *G06F 3/1431* (2013.01); *G06F 3/1454* (2013.01); *G06F 9/452* (2018.02)

(58) Field of Classification Search
CPC ............................. G06F 3/1454; G06F 9/452
See application file for complete search history.

(56) References Cited

U.S. PATENT DOCUMENTS

| | | | |
|---|---|---|---|
| 8,370,838 B1 * | 2/2013 | Omelyanchuk | G06F 9/45558 718/1 |
| 2011/0246904 A1 | 10/2011 | Pinto et al. | |
| 2014/0006548 A1 * | 1/2014 | Tsolis | G06F 16/9577 709/217 |
| 2017/0034023 A1 | 2/2017 | Nickolov et al. | |
| 2024/0028355 A1 | 1/2024 | Liu et al. | |
| 2024/0296003 A1 | 9/2024 | Seidman et al. | |

OTHER PUBLICATIONS

Non-Final Rejection in U.S. Appl. No. 18/447,189 mailed Aug. 13, 2024.

* cited by examiner

*Primary Examiner* — Kwang-Su Yang
(74) *Attorney, Agent, or Firm* — NIXON PEABODY LLP

(57) ABSTRACT

A system and method for supporting multiple physical monitors of an endpoint device that allows access to a virtual desktop running on a host. The system allows streamlining the configuration of the reserved display identification by using semantic hints, with the framework of the extended physical display arrangement. The system allows for configuring a reserved physical display allowing an end user to have certain classes of content (such as video or screen-sharing) always appear on the reserved display, bypassing the virtual desktop.

17 Claims, 19 Drawing Sheets

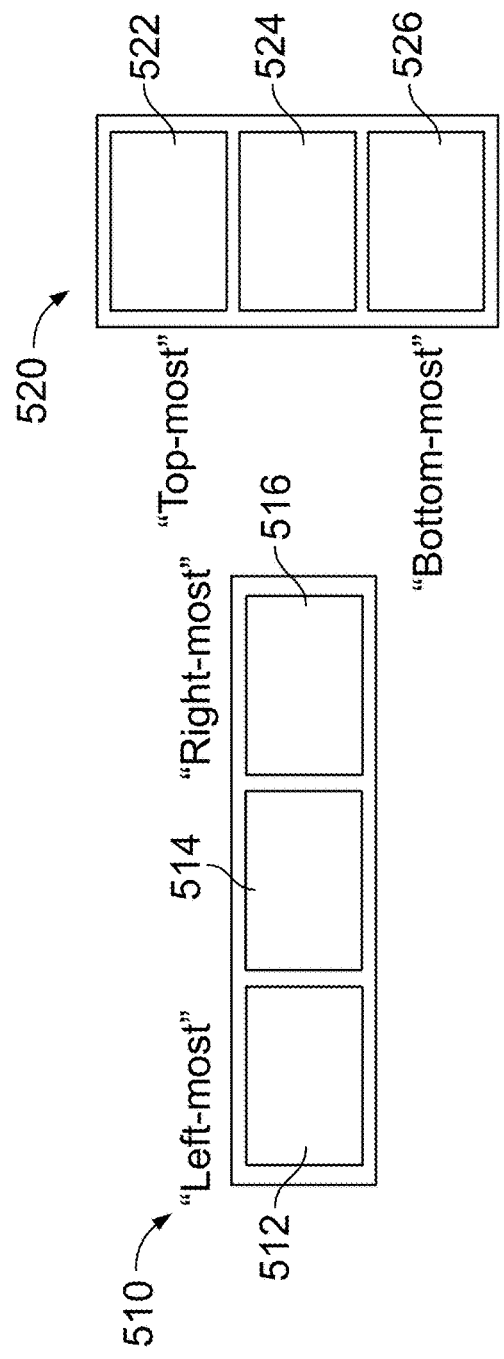

Reserved Layout Hint Examples

FIG. 5A

| Example Hint | System Interpretation |
|---|---|
| Left-most | Select the display with the effective left boundary of the virtual coordinate system |
| Right-most | Select the display with the effective right boundary of the virtual coordinate system |
| Top-most | Select the display with the effective top boundary of the virtual coordinate system |
| Bottom-most | Select the display with the effective lower boundary of the virtual coordinate system |

FIG. 5B

Automatic Reconfiguration when Arrangement Changes

SYSTEM AND METHOD FOR MULTIPLE DISPLAYS CONNECTED TO A CLOUD DESKTOP

PRIORITY CLAIM

This application claims priority to U.S. Provisional Application No. 63/488,097, filed on Mar. 2, 2023. The entirety of that application is hereby incorporated by reference.

TECHNICAL FIELD

The present disclosure relates generally to network-based virtual desktop systems. More particularly, aspects of this disclosure relate to a system that provides support for multi-monitor displays for virtual desktop systems.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

A cloud desktop is a virtual machine created in a public or private data center, and typically does not have any display or input devices that are physically accessible to an end user of the cloud desktop. Thus, a cloud desktop will generally have one or more virtual displays (that can emulate a physical display) and one or more virtual input devices (that can emulate a physical input device, such as a mouse) associated with the cloud desktop. The user typically accesses the cloud desktop by using special client application software that runs on an endpoint device co-located with the user.

The endpoint device typically has one or more physical displays (monitors) and input devices either built into it, or connected to it, that are directly accessible to the user. Multiple physical displays are used to extend the entire display region beyond what can be rendered on a single physical display. However, specific computers that are endpoint devices may have different numbers and types of display devices. Thus, while desktops provided by the cloud-based system may have the same applications, the displays rendered by such applications on the physical monitors may differ based on the setups of the physical monitors available to the specific computer. When a remote display protocol connection is made between the client application software and the cloud desktop, the extended physical displays available to the endpoint device may be mapped to virtual displays on the cloud desktop, allowing the multi-display capability of the cloud operating system to be accessed by the user of the endpoint device in a way that emulates the multi-display capability of a local (non-cloud) desktop.

Presently known cloud desktops may create a number of issues in relation to use of multiple monitors by physical endpoint devices. These issues may include: 1) the cloud desktop not accounting for the reservation of one or more endpoint monitors for local applications; 2) redundant rendering of content at the cloud desktop browser and the physical display of the endpoint device; 3) use of a browser based client resulting in requiring multiple browsers for multiple physical displays; 4) initial arrangement of multiple display content on a single monitor, requiring a user to manually reposition content on multiple monitors; and 5) native resolutions on displays that may not be supported by a web based client application and thus result in a lower quality display.

Thus, there is a need for a system that allows reservation of a display in an endpoint device for localized application content. There is a need for a system that allows automatic assignment of one of several physical monitors to act as a reserve display and others for display of a virtual display. There is also a need for use of a browser application to use a single consolidated stream to display content on multiple physical monitors.

SUMMARY

One disclosed example is a virtual desktop system including a host and a virtual desktop executed on the host. An endpoint device is in network communication with the host via a client application. A plurality of physical monitors is coupled to the endpoint device. The client application displays a virtual display of the virtual desktop on one of the physical monitors and reserves one of the physical monitors as a reserve monitor for display of content of an application executed on the endpoint device based on a semantic hint.

In another implementation of the disclosed example system, the semantic hint is derived from an input to an interface displayed by the client application on one of the physical monitors. In another implementation, the semantic hint includes a description of the relative positions of the plurality of monitors. In another implementation, the semantic hint applies a virtual coordinate system to the plurality of monitors to display the virtual display. In another implementation, when the physical monitor reserved as the reserve monitor is disconnected, the client application applies the semantic hint to select another of the monitors as the reserve monitor. In another implementation, the system includes a reserve monitor selection input to select a type of content to be displayed on the reserve monitor, the type of content generated via a content host coupled to the network. In another implementation, the content specification of the content is communicated from the host to the endpoint device via a remote display protocol (RDP) connection stream on the network. In another implementation, the content is defined by a universal resource locator (URL).

Another disclosed example is a method for supporting multiple monitors for a virtual desktop. A virtual desktop with a virtual display is executed on a host. Network communication is provided between the host and an endpoint device via a client application. The virtual display of the virtual desktop is displayed on one of a plurality of physical monitors coupled to the endpoint device via a client application executed by the endpoint device. One of the physical monitors is reserved as a reserve monitor for display of content of an application executed on the endpoint device based on a semantic hint.

In another implementation of the disclosed example method, the semantic hint is derived from an input to an interface displayed by the client application on one of the physical monitors. In another implementation, the semantic hint includes a description of the relative positions of the plurality of monitors. In another implementation, the semantic hint applies a virtual coordinate system to the plurality of monitors to display the virtual display. In another implementation, the method includes applying the semantic hint to select another of the monitors as the reserve monitor via the application when the physical monitor reserved as the reserve monitor is disconnected. In another implementation, the example method includes generating an input to select a type of content via the client application via a content host coupled to the network to be displayed on the reserve monitor. In another implementation, content specification of the content is communicated from the host to the endpoint device via a remote display protocol (RDP) connection stream on the network. In another implementation, the content is defined by a universal resource locator (URL). In another implementation, the virtual desktop scales the virtual display to a native resolution of a corresponding physical monitor.

Another disclosed example is a non-transitory computer-readable medium having machine-readable instructions stored thereon. The instructions when executed by a processor of an endpoint device, cause the processor to provide network communication between a host and the endpoint device. The host executes a virtual desktop with a virtual display. The instructions cause the processor to display the virtual display of the virtual desktop on one of a plurality of physical monitors coupled to the endpoint device. The instructions cause the processor to reserve one of the physical monitors as a reserve monitor for display of content of an application executed on the endpoint device based on a semantic hint.

In another implementation of the disclosed example computer-readable medium, the instructions cause the processor to display an interface on one of the physical monitors that includes an input for the semantic hint. In another implementation, the semantic hint includes at least one of a description of the relative positions of the plurality of monitors; a virtual coordinate system to the monitors to display the virtual display; and a selection of another of the monitors as the reserve monitor when the physical monitor reserved as the reserve monitor is disconnected. In another implementation, the instructions cause the processor to generate an input to select a type of content via a content host coupled to the network to be displayed on the reserve monitor.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 5A shows example of layout hints for multiple physical monitors;

FIG. 5B is a table of example descriptions of layout hints and monitor locations;

Figure 1:
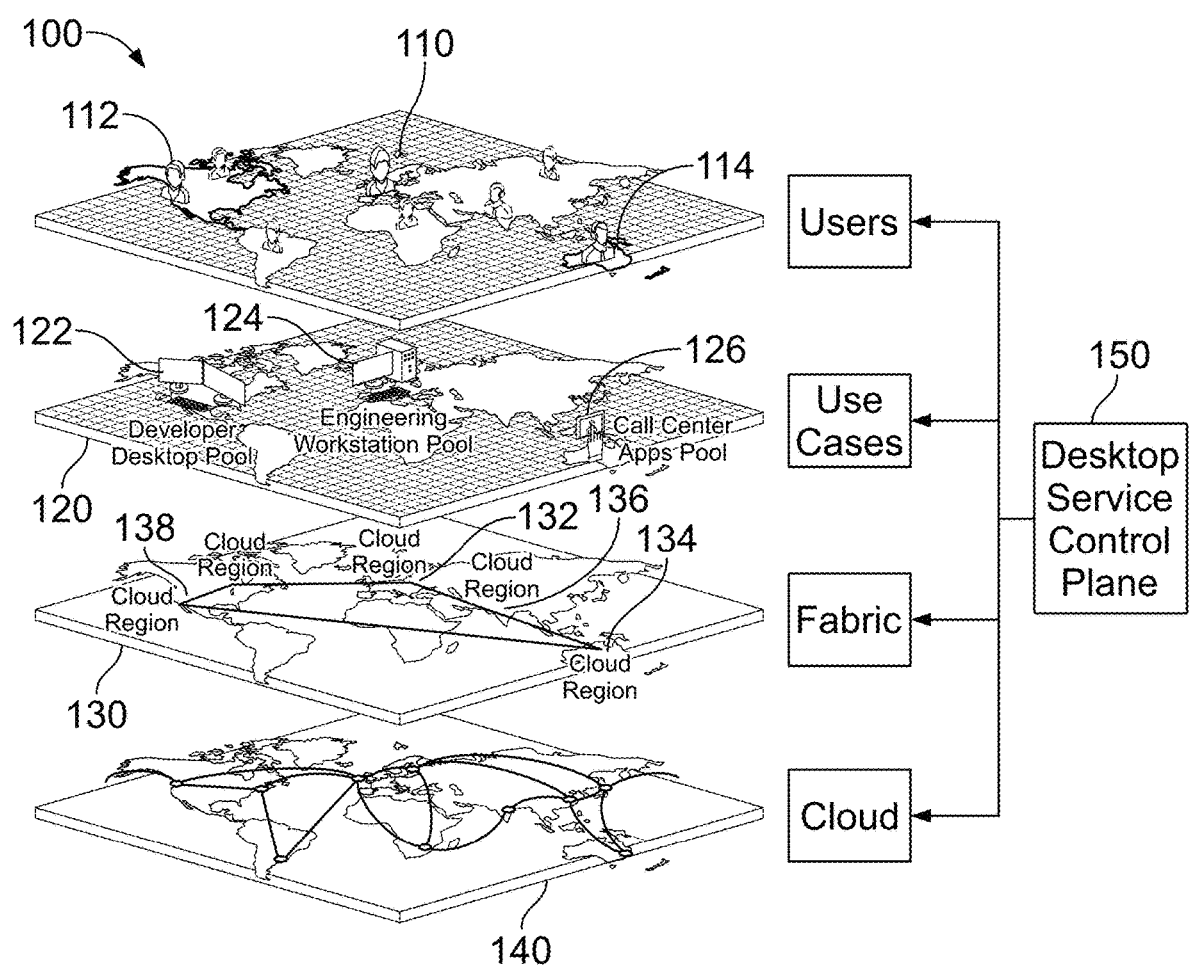
FIG. 1 is a high-level block diagram illustrating an example cloud based system allowing access to virtual desktops from different cloud providers.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system relating to allowing multi-monitor functionality for Cloud desktops. The system allows streamlining the configuration of the reserved display identification by using a system of relative semantic hints, with the framework of the arrangement of extended physical displays. This provides a layer of indirection that more closely matches the intention of the end-user while making the configuration more resilient when the physical display arrangement changes. The system allows for the configuration of a reserved physical display that allows an end user to have certain classes of content (such as video or screen-sharing) always appear on the reserved display thus bypassing the virtual desktop. The system also allows one web-based client application to communicate with other application within the common web application environment in order to create a single consolidated RDP stream on the endpoint device to display content on multiple physical monitors. The system allows using configuration information available to the web-based application running in the browser. This allows all virtual displays to automatically appear on the respective physical displays in full screen by default. Finally the system allows automatic configuration of virtual displays to match resolution of physical displays.

The following are definitions of terms used in this disclosure that relate in general to the multi-monitor innovations:

Physical Display: a hardware display, sometimes called a screen, or monitor, physically connected to the endpoint device using some technology such as HDMI, USB, DisplayPort, and the like. A Physical Display has a maximum supported native display resolutions (the density of pixels per square inch).

Physical Pixel: the smallest discrete unit of display supported by a physical display.

Physical Display Arrangement: the configuration about the relative placement of multiple physical displays in the real world. In the case of multiple physical displays, the endpoint device operating system keeps the physical display arrangement configuration about the relative placement of the physical displays. This information is used to allow users to express preference for how windowing operating systems allow content, and the mouse pointer, to be moved between Physical Displays to create an optimal user experience. For example, if two physical displays are physically adjacent such that they are side by side, the user would expect the mouse pointer to transition smoothly between the displays when the physical mouse is moved laterally. In order to accomplish this the system needs to know that the physical monitors are in fact side by side.

Virtual Display: one or more displays configured on the cloud desktop during a remote display protocol session with an endpoint device. Each of these virtual displays must be mapped to some Physical Display during the session.

Virtual Pixel: the smallest discrete unit of display generated by a Virtual Display.

Reserved Physical Display: usually one, but possibly multiple, physical displays may be reserved for use by the Endpoint Device during the remote display protocol session.

Automatically Reserved Monitor: a physical display that is identified and reserved for local display, allowing the other Physical Displays to be mapped to virtual displays, even when the set of physical displays changes (for example, by plug-and-play technology), without the need for end-user interaction.

Content Rendered Locally: Content from a web server that is directly rendered on the local endpoint device. This is a common type of use of a cloud desktop is to allow the end user to interact with multi-media content, teleconferencing, or other applications that are demanding network resources such as bandwidth. Furthermore, these applications are sensitive to network latency. End users will often experience better performance if such content is hosted in a web browser running on the endpoint device itself. It is possible to intercept certain requests for content (for example, certain patterns of URL) on the cloud desktop and redirect these to the endpoint device, to spare end users from having to obtain the URL themselves and manually load it into the local web browser.

Client Application: an application running on the endpoint device that creates one or more connections for this purpose with a cloud desktop. The end user interacts with the remote display protocol session by means of the client application.

Installed Client Application: a dedicated software application installed onto the endpoint device.

Web-based Client: a Web Browser hosting a web application for this purpose on the endpoint device, without the need for an installed client application. The end user interacts with the remote display protocol session by means of the Web-based client.

Cloud PC Agent: software running on the cloud desktop that works with the client application to optimize the user's experience.

Remote Display Protocol (RDP) Connection Stream: an object representing various sequences of data elements between an RDP service (such as a cloud desktop) and a consuming RDP client (such as an endpoint device) to support the RDP protocol. It includes multiple channels that support remote graphical rendering, collecting user input events (such as keyboard and mouse events) and other information that may be required to support the lifecycle and maintenance of an RDP connection.

Standard Display Resolution: the normal resolution (density of pixels) of a virtual display.

Native Display Resolution: the ability to take advantage of a physical display that supports a higher-quality resolution (higher density of pixels) than the standard resolution of a virtual display, by scaling up the resolution to match the physical display capability.

The disclosure relates to a system that provides for: 1) allowing a user to seamlessly reserve a monitor on an endpoint device for displaying local application content while maintaining the mapping of virtual displays to non-reserved monitors; 2) selecting a reserved monitor for display of certain content; 3) providing web-based multiple displays for cloud desktops; 4) creating a single consolidated RDP stream for multiple web based virtual displays; and 5) automatically selecting a resolution for a virtual display to match the resolution of a physical display.

FIG. 1 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common global pools of desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the desktop. The use cases layer 120 represents common logical pools of desktops available to serve the users, whereby each logical pool may be based on common desktop requirements. There can be multiple logical pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the desktop. The desktops in a particular pool may each be supported by different cloud regions based on the requirement of the desktop pool.

For example, pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions such as cloud regions 132, 134, 136, and 138. The cloud regions can be added or removed as needed.

The cloud layer 140 implements the resources defined by the use case layer 120 and fabric layer 130, including virtual desktops, infrastructure, and other virtual resources, all of which are virtual machines or other virtual resources hosted in a public cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 3. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance desktop service from the cloud desktop service system 100. Users, such as users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc. In this example, the client application displays an icon of the desktop or desktops available to the user. As will be explained, the desktop is made available to the user through the client application on the user device.

Figure 2:
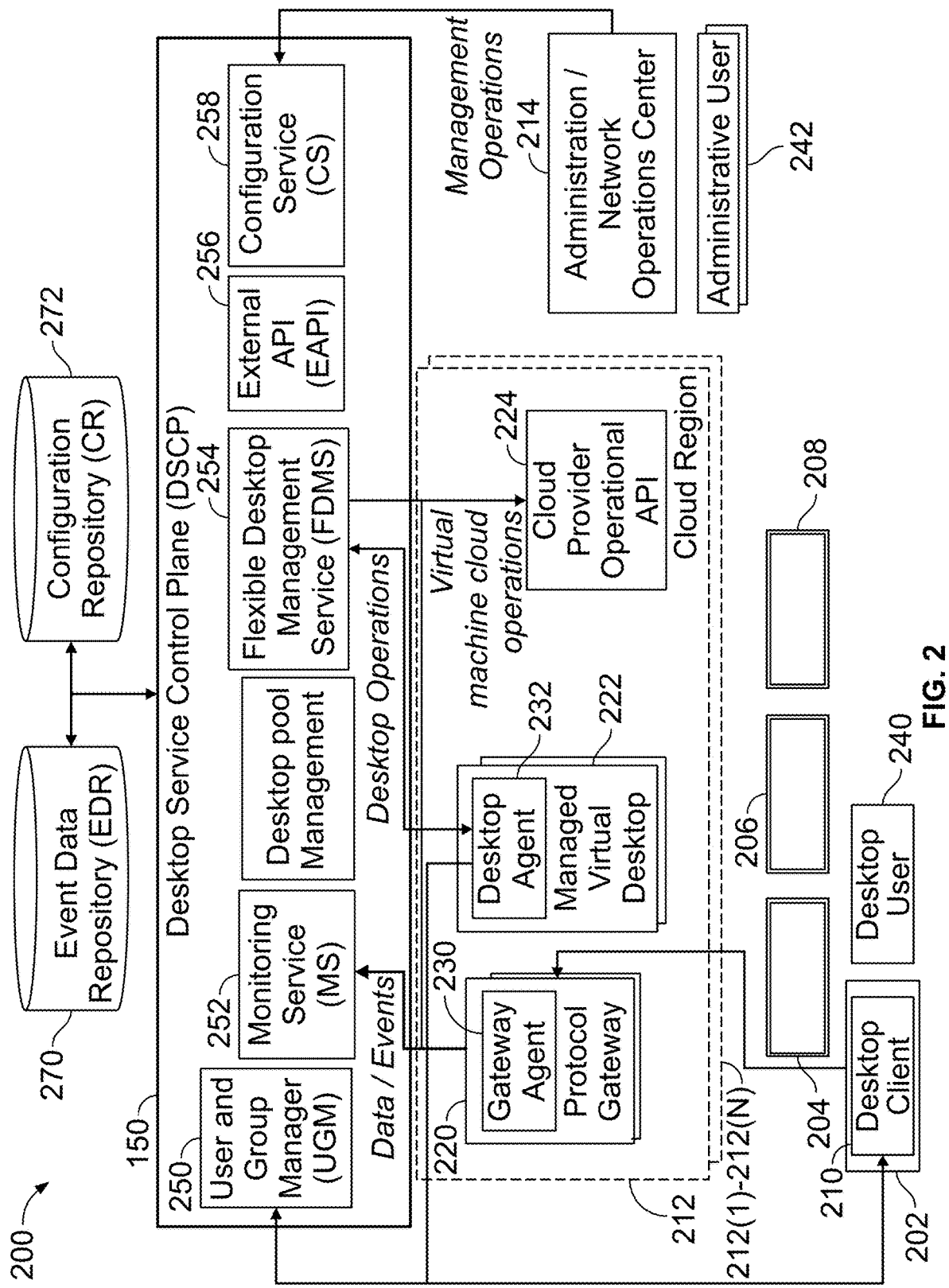
FIG. 2 is a block diagram of a cloud region and desktop service control plane of the example cloud desktop fabric in FIG. 1.

FIG. 2 is a block diagram of some examples of components of the cloud desktop service system 100 that provides cloud desktops for endpoint devices such as an endpoint device 202. In this example, the endpoint device 202 may be a user computer or other device. In this example, the endpoint device 202 represents a work station with multiple monitors such as display 204, display 206 and display 208. Although three displays are shown in FIG. 2, any number of displays may be supported by the endpoint device 202. The endpoint device 202 runs a desktop client application 210.

The cloud desktop service system, including an example set of desktop clients such as the desktop client application 210, a cloud region 212, and an administration center 214, that interact with and can be orchestrated by the desktop service control plane 150. The desktop client application 210 communicates with the desktop service control plane 150 in order to be registered with the fabric, assigned a desktop, remotely configured, and for other purposes. One other purpose is to monitor latency, response-time, and possibly other data and events that measure quality of user experience. Another purpose is to report user interaction events. There may be multiple cloud regions (e.g., cloud regions 212(1) to 212(N)) similar to the cloud region 212, but only one cloud region 212 is shown in detail for simplicity of explanation. The cloud region 212 may include a set of protocol gateways 220, a set of managed virtual cloud desktops 222, and a cloud service provider operational API 224. These components all communicate with the desktop service control plane 150. The cloud region 212 may be one of the cloud regions 132, 134, 136, and 138 in FIG. 1.

Such cloud regions include servers that host the various applications as well as appropriate storage capabilities, such as virtual disks, memory, and network devices. Thus, the cloud region 212 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A cloud region may include a firewall to control access to the applications hosted by the cloud region. The firewall enables computing devices behind the firewall to access the applications hosted by the cloud region, but prevents computing devices outside the firewall from directly accessing the applications. The firewall may allow devices outside the firewall to access the applications within the firewall using a virtual private network (VPN).

The protocol gateway 220 may be present to provide secure public or internal limited access to the managed virtual desktops, that may be deployed on a virtual machine of its own. A gateway agent 230 is software that is deployed on that gateway virtual machine by the desktop service control plane 150, and serves to monitor the activity on the gateway 220, and enable the desktop service control plane 150 to assist in configuration and operations management of the gateway 220.

The example desktop client application 210 is software and device hardware available in the local environment of a desktop user 240 to remotely access a managed virtual desktop using a remote desktop protocol. The desktop client application 210 communicates with the desktop service control plane 150 to monitor latency, response-time, and other metrics to measure quality of user experience and also supports a remote display protocol in order for users to connect to a desktop application run by the cloud region 212.

The managed virtual cloud desktop 222 is itself provisioned and maintained by the desktop service control plane 150. A desktop template may be used to manage pools of such managed virtual desktops. The desktop template is used to instantiate virtual desktops with the correct virtual machine image and a standard set of applications for a particular use case. A desktop agent such as desktop agent 232 is software that is deployed on that managed virtual desktop by the desktop service control plane 150, and serves to monitor the activity on the managed virtual desktop, and enable the desktop service control plane 150 to assist in configuration and operations management of the managed virtual desktop.

The cloud service provider operational application programming interface (API) 224 presents services provided by the cloud service provider that also participate in the management of the virtual machine. This can be utilized by a desktop service control plane 150 to perform operations like provisioning or de-provisioning the virtual machine.

Administrative users 242 can interact with operations reporting interface software at the administration center 214 that allows management and administration of the desktop service control plane 150.

Other components and services may interact with the desktop service control plane but are omitted from FIG. 2 for simplicity, such as enterprise connectors, network monitoring services, customer relationship management (CRM) systems, and many others.

The desktop service control plane 150 itself can perform many internal centralized functions also not depicted in in FIG. 2, including pool management, user and group management, cloud service adapters, virtual desktop templates, data analysis, high-availability management, mapping users to the optimal cloud region, security policy management, monitoring, compliance, reporting, and others.

The control plane 150 includes a user and group manager 250, a monitoring service 252, a desktop management service (DMS) 254, an external API (EAPI) 256, and a configuration service (CS) 258. The control plane 150 may access an event data repository 270 and a configuration repository 272. Although only one cloud region 212 is shown in detail, it is to be understood that the control plane 150 may facilitate numerous cloud regions.

The monitoring service 252 makes both routine and error events available to administrators and can analyze operational performance and reliability. The monitoring service 252 interacts with components and may include the desktop client application 210, gateway agent 230, and desktop agent 232 to obtain operational data relating to the desktop, and operational data generated by the control plane 150 itself. The monitoring service 252 stores all such operational data for later analysis. As will be explained desktop clients may report information about the location of the user. Desktop agents can report information about the duration of each connection, and other performance information, including the applications used by the desktop. Gateway agents can also report performance information because the gateway agent sits between the desktop client and the desktop on the network.

The desktop management service 254 interacts with the one or more managed virtual machines (MVMs) 222 in the cloud region 212 and other regional cloud regions 212(1) to 212(N). In this example, the desktop management service 254 manages resources for providing instantiated desktops to the users in the logical pools, orchestrating the lifecycle of a logical desktop. As will be explained, the management service 254 includes a desktop pool resource management engine 280. The desktop pool resource management engine 280 determines the requirements for desktop pools and the constraints of the regional cloud regions for optimal allocation of desktops in the desktop pool, and may use the data collected by the monitoring service to determine optimal allocation of virtual desktops.

The administration center 214 works directly with the data control plane 150 as its primary human interface. The administration center 214 allows the administrative user 242 to configure the functions of the control plane 150 through the configuration service 258. The configuration service 258 supports editing and persistence of definitions about the desktop service, including subscription information and policies. The system 200 in FIG. 2 allows the creation and management of desktop pools for groups of users.

One example feature for multi-monitor support is allowing a user 240 to reserve one of the displays 204, 206 or 208 for local applications executed by the endpoint device 202 in FIG. 2. When the multiple extended physical displays 204, 206, and 208 are configured for an endpoint device such as the endpoint device 202 in FIG. 2, there is some relative arrangement of them that is understood by the endpoint device operating system, to improve end user experience. For example, if the extended physical displays are arranged in a horizontal layout, the user expects graphical objects to behave as if there was a single wider display area. For example, mouse movements such as changes of pointer location, or dragging objects such as windows, between adjacent physical displays is handled seamlessly, and the boundaries of the effective display area are clipped by the left and right edges implied by the horizontally aligned physical arrangement. A similar mapping and clipping scheme is used for the top and bottom edges for a vertically aligned physical arrangement.

Figure 3:
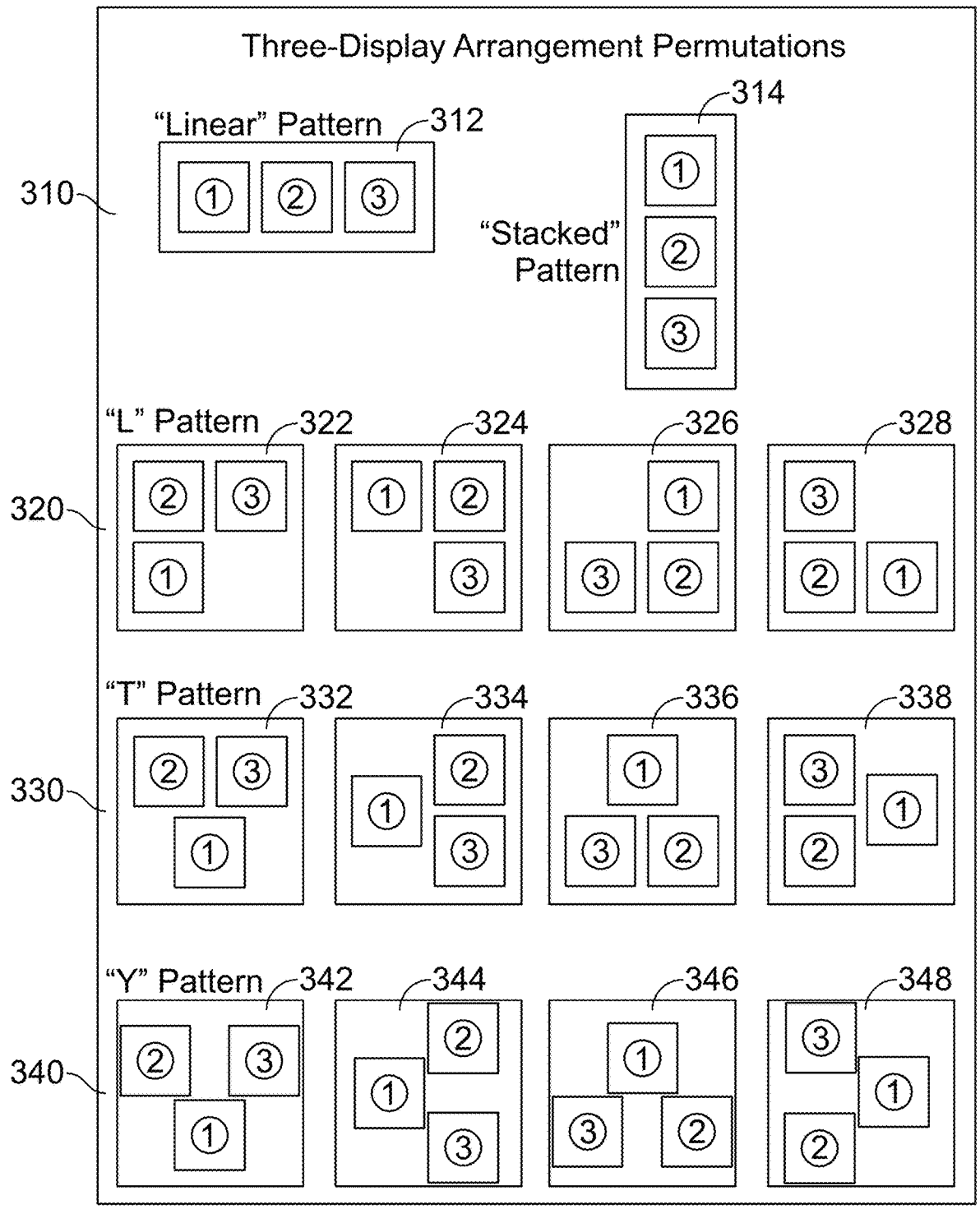
FIG. 3 is a chart of potential display arrangements for three monitors in an example endpoint device.

For this to happen, the endpoint operating system must be made aware of the physical arrangement, typically done by a configuration requirement. The permutations of arrangements as configured for a typical endpoint device operating system are shown in FIG. 3 for an example of three named displays "1", "2", and "3". In this example, the three displays may be arranged in one of a set of linear patterns 310, a set of "L" patterns 320, a set of "T" patterns 330, and a set of "Y" patterns 340. Thus, the set of linear patterns 310 includes a horizontal linear pattern 312 or a stacked vertical pattern 314. The set of L patterns 320 includes patterns 322, 324, 326, and 328. The set of T patterns 330 includes patterns 332, 334, 336, and 338. The set of Y patterns 340 includes patterns 342, 344, 346, and 348. In this example, there are really four possible patterns, with reflection or rotation creating some variations of the three displays. However, as more displays are added, the number of permutations can become quite large.

When the client desktop application 210 running on the endpoint device 202 creates a remote connection to a cloud desktop such as the cloud desktop 222 in FIG. 2, a virtual display for one or more of the physical displays is typically created and mapped to the physical displays according to the physical arrangement configured on the endpoint device operating system. A mapped physical display typically shows a maximized view of an entire virtual display, effectively creating an emulation of a local desktop experience with multiple displays.

Not all possible arrangements of physical displays may be supported as virtual displays. Limitations may be imposed by the underlying technology, including the RDP protocol or other constraints. For example, in some environments, all virtual displays must be logically contiguous.

Figure 4A:
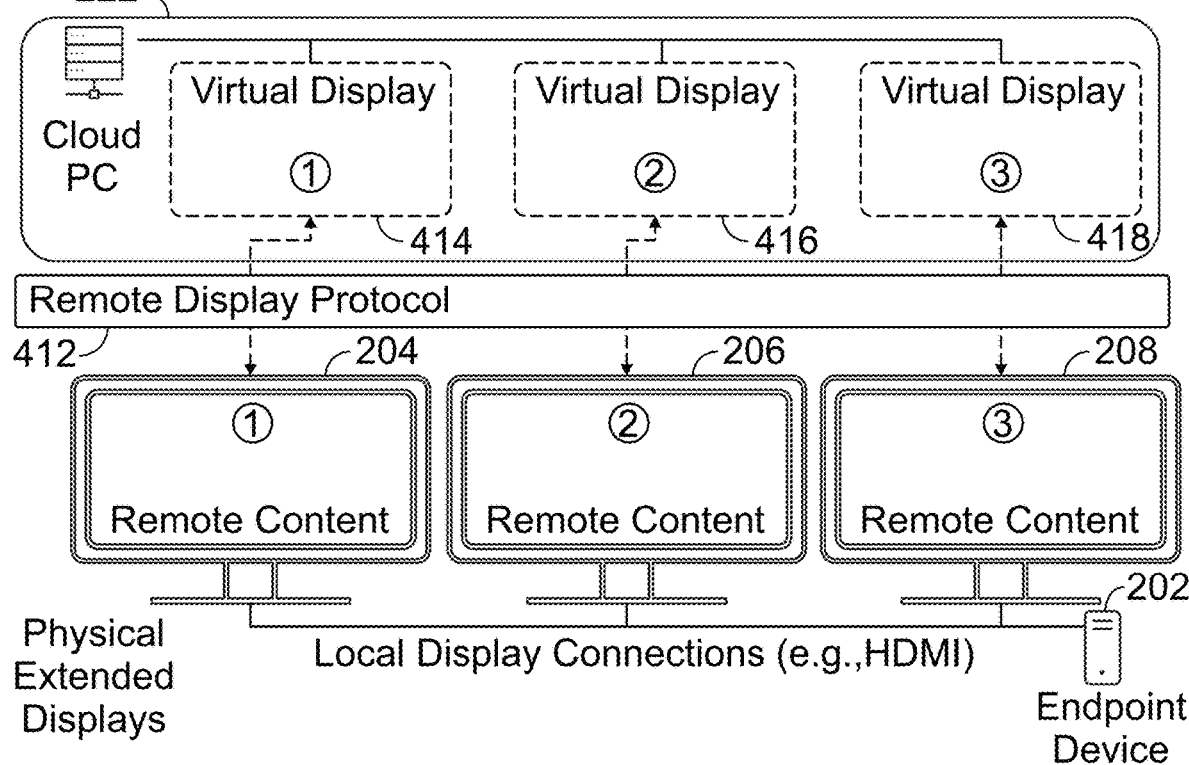
FIG. 4A is a diagram of an example prior art process of mapping virtual displays to physical displays.

A typical result of mapping virtual displays to physical displays is diagrammed in FIG. 4A. In the example in FIG. 4A, the cloud desktop 222 is coupled to a remote desktop protocol (RDP) protocol layer 412. The cloud desktop 222 has three virtual displays 414, 416, and 418. The virtual displays 414, 416, and 418 in this example are directly mapped to physical displays 204, 206, and 208.

In this scenario, the end user may have some inconvenience when there is a desire to interact with other local applications running on the endpoint device 210. For example, the end user may wish to access some productivity or communication software that is native to the endpoint device 210, without having to manage the fully maximized displays 204, 206, and 208 that are showing virtual displays 414, 416, and 418 on the cloud desktop 222. The end user may therefore sometimes elect to suppress the mapping of at least one physical display, effectively reserving the physical display for local application use.

Figure 4B:
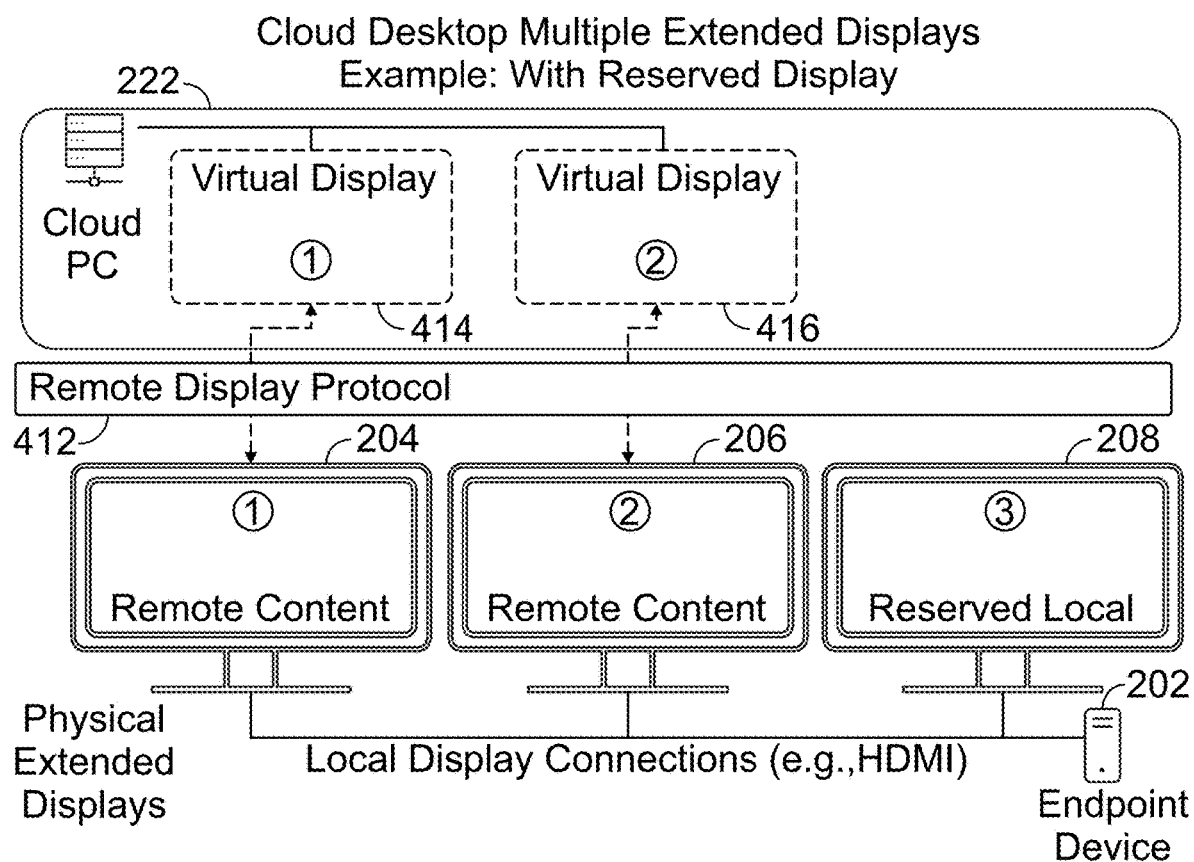
FIG. 4B is a diagram of another example prior art process of mapping virtual displays to physical displays when a display is reserved for local content.

Typically, in order to accomplish this, the end user must allow the client application software to choose which physical display to reserve, or must have a means to configure which physical display to reserve by name. FIG. 4B shows an example where the physical display 208 is configured to be reserved during the remote display connection session. The client application specifies the virtual displays required for each session. In this example, the cloud computer 222 was only requested to provide two virtual displays 414 and 416 for a session. Any content that had previously been rendered on more than two virtual displays is simply remapped onto two virtual displays, much the same as when a physical plug-and-play monitor is disconnected from a physical device. This process can lead to inconvenience for the end user in cases where the arrangement of physical extended displays changes. For example, if one of the physical displays 204, 206, or 208 is disconnected or is powered down, if a new physical display is temporarily connected to the endpoint device 210, or the arrangement of physical displays is changed, re-configuration of the reserved display is required.

In such cases, the mapping of the desired display arrangement, including the identification of the display to be reserved for local use, must be re-configured by the end user, or the end-user may encounter incorrect display mapping behavior during their next connection session with the cloud desktop. For example, if a new physical display 4 is locally connected to the endpoint device and locally arranged to the right of physical display 3, it is likely that there will be an additional virtual display 3 created in the current or next RDP session that is mapped to physical display 4. The intention of the user that the rightmost display be reserved for local use will be lost because the specification of the reserved display explicitly referred to physical display 3 as the reserved one.

The features of the present multi-monitor system allow streamlining the configuration of the reserved display identification by using relative semantic hints with the framework of the arrangement of extended physical displays. This provides a layer of indirection that more closely matches the intention of the end-user while making the configuration more resilient when the physical display arrangement at the endpoint device changes.

A layout hint is any configuration value that is meaningful to the end user that can be resolved to a named physical display, so that the system can select a physical display that is a better choice for the user than a completely random or arbitrary selection. The simplest examples of layout hints are descriptions of relative position with the combined coordinate system that includes all possible physical displays in some arrangement.

FIG. 5A shows examples of layout hints, using the simple examples described above. In this example, a first layout hint 510 includes arrangement of three virtual displays with a left-most display position 512, a center display position 514, and a right-most display position 516. A second layout hint 520 includes top-most display position 522, a center display position 524, and a bottom-most display position 526.

FIG. 5B shows a table 550 that describes the examples in FIG. 5B and the interpretation that can be applied to them. Thus, the table 550 has entries 552, 554, 556, and 558 corresponding to the left-most display position 512, the right-most display position 516, the top-most display position 522, and the bottom-most display position 526. Each entry 552, 554, 556, and 558 in the table 550 uses the merged coordinate system that includes all extended displays known to the endpoint device 210. For example, the left-most display entry 552 select the display with the effective left boundary of the virtual coordinate system.

Figure 5C:
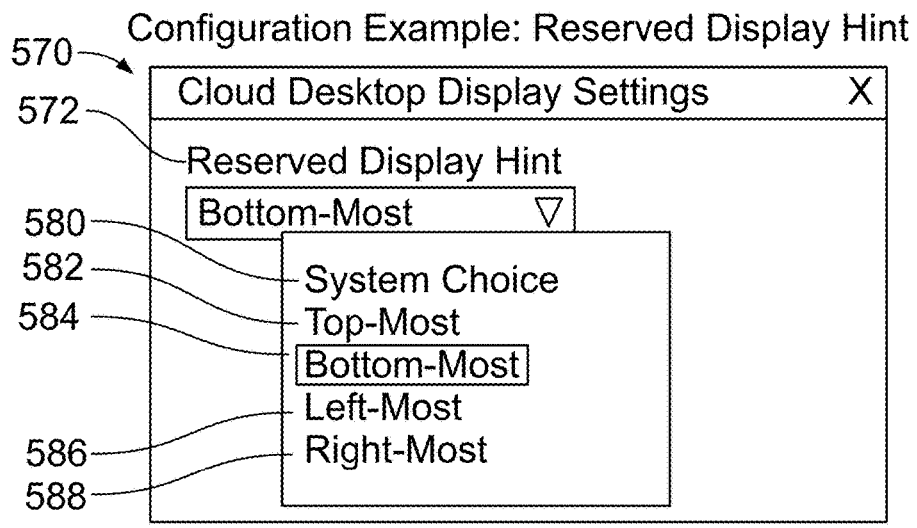
FIG. 5C is an example interface allowing a user to select a layout hint.

FIG. 5C shows an example interface 570 that allows a user to select a particular layout hint for assigning virtual displays to actual physical displays. The interface 570 includes a drop-down menu 572 that includes different layout hints that may be selected by a user. The menu 572 includes a system option 580, a left-most display position 586, a right-most display position 588, a top-most display position 582, and a bottom-most display position 584. Each of these options can be mapped into the layout configuration of extended displays that is maintained by the endpoint device operating system to specify the display that is to be reserved. For example, if the left-most display position 586 is selected, this can be resolved to the physical display that includes the effective left boundary of the virtual coordinate system as detailed in 552 and that physical display will be excluded from being mapped onto a virtual display. In some implementations this interface could be more graphical, have more guidance for the user such as showing the arrangement of the configured physical displays, or have other features to enhance the user experience. In this example, the user may also select the system option 580 to specify that the system may choose the reserved display because the user does not have a preference.

Figure 6:
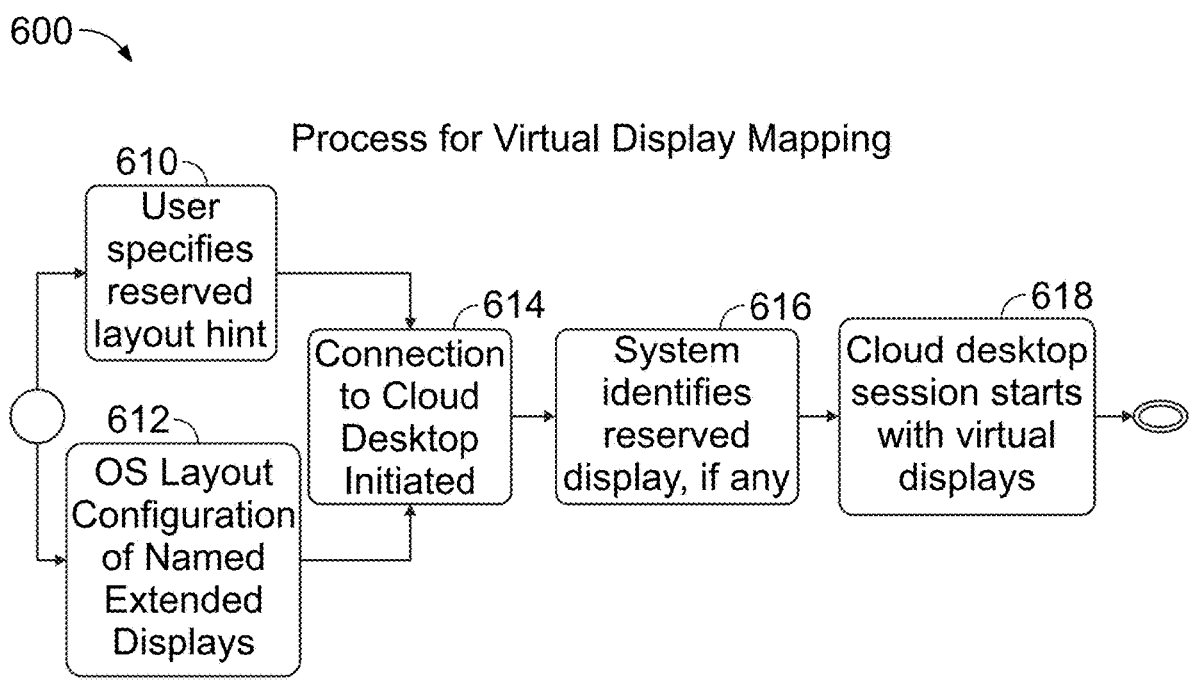
FIG. 6 is a flow diagram of an example selection for a reserved layout.

As stated above, the layout hint is used to assist in creating the desired arrangement of virtual displays. The overall process can be described in FIG. 6 that shows a flow diagram of the routine for selection of a reserved layout. The user expresses a reserved layout hint while configuring the desired experience (610). Typically this may be in a settings function of the client application software running on the endpoint device. For example, the settings function may be a menu such as the menu 572 shown in FIG. 5C with valid hints that are available choices listed in the menu 572 given the current arrangement of physical displays. The user may also opt to default to the system setting by selecting the default system option 580 in the menu 572 (612).

The current physical arrangement is ascertained by the client software running on the endpoint devices, as known to the operating system on that device. In some examples of endpoint device operating systems, this is a feature of the display settings configuration capability of the operating system. At this point the effective arrangement may have changed without explicit configuration because display devices may have been added or removed from the endpoint device.

The user initiates a connection to the cloud desktop (614). Using the information obtained from the user input and the current physical arrangement, the system can resolve the layout hint into a named display to reserve, if any (616). This information is made available to the cloud desktop as part of the action of establishing the cloud desktop session (618).

The user can access the virtual displays as part of the connection session with the cloud desktop on the non-reserved physical displays, with the possibility of a physical display reserved for local applications.

In some arrangements, there may be physical displays that must remain local, due to constraints that the hint about the reserved display should not be ambiguous (for example, if there are multiple displays aligned along the "top"). Alternatively, ambiguous hints could be resolved using predefined default precedence (for example, when there are two "top-most" displays, the "left-most" of these may be preferred).

Alternatively, the system could select the reserved display using some internal logic of its own. The automatic selection of a reserved display may be seen in FIG. 7. In an initial setup 700, monitors 204, 206, and 208 are arranged in a vertical arrangement. In this example, the monitor 208 is the bottommost monitor. In this example, the monitor 208 is identified as the reserve monitor. When a connection session is established with the cloud desktop, the display 208 named "3" is reserved for local use.

Figure 7:
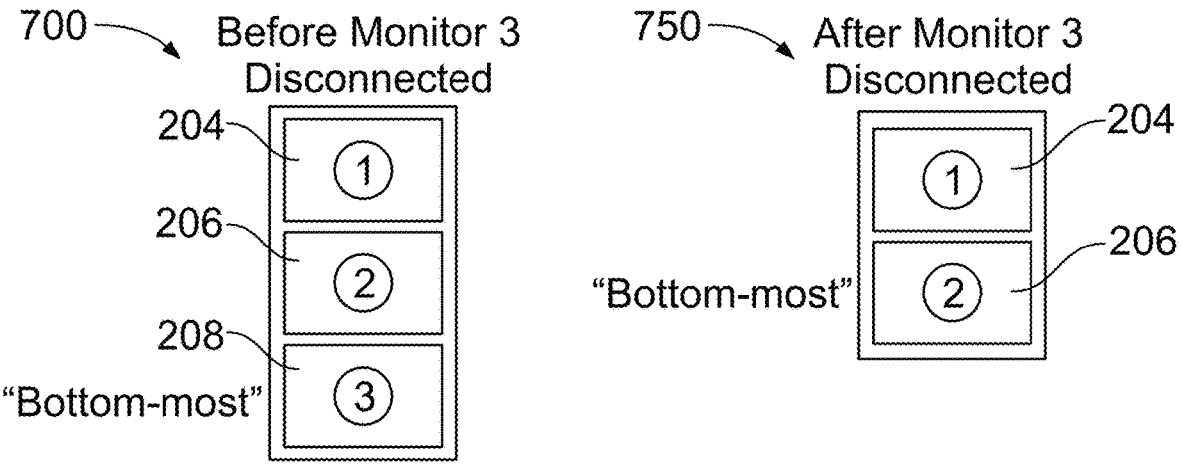
FIG. 7 is a diagram showing automatic reassignment of a physical monitor for a reserved monitor.

A subsequent setup 750 in FIG. 7 illustrates a situation when the monitor 208 is disconnected (or powered down) from the endpoint device. The monitor 208 is disconnected in the second arrangement leaving the monitors 204 and 206. In this example, the monitor 206 (Display 2) is automatically resolved as the reserved display by the process explained above. This behavior would not be possible if the reserved display was configured as a named display and not by the layout hint.

Figure 8A:
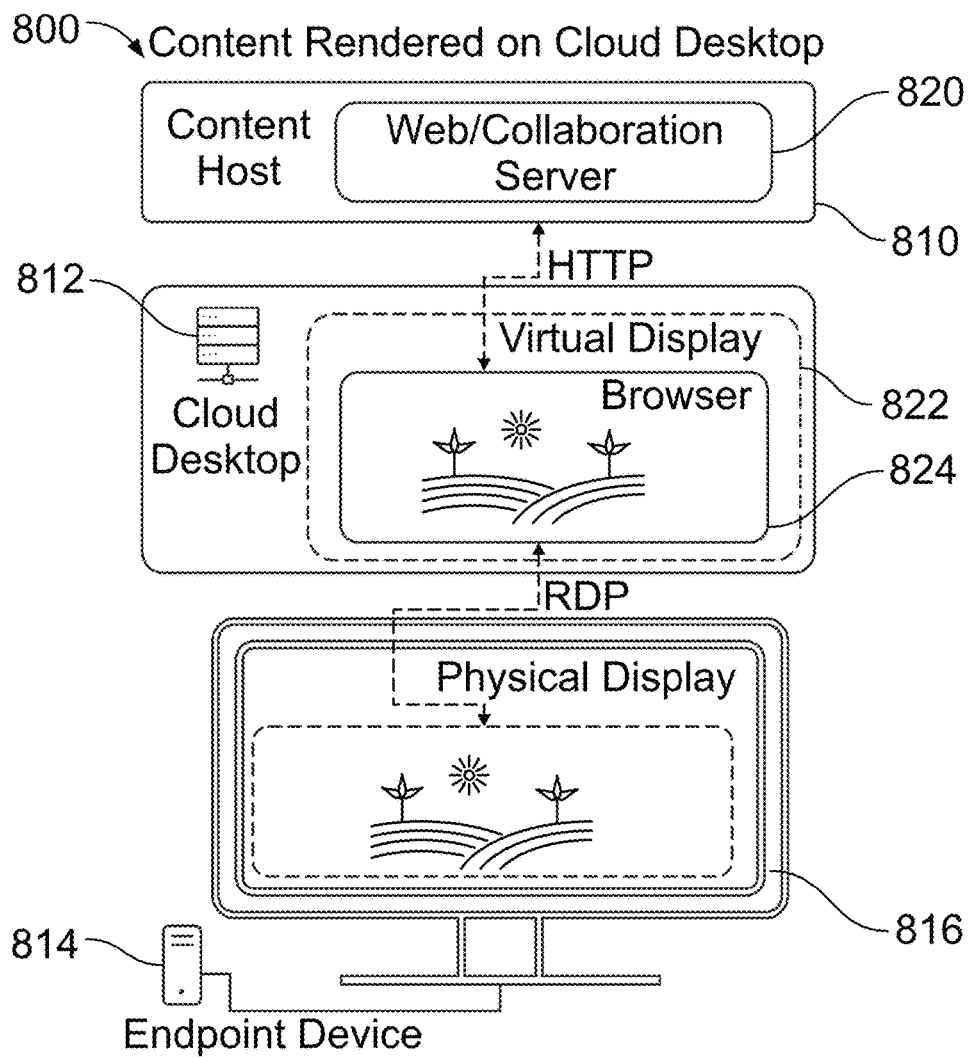
FIG. 8A is a prior art arrangement for display of web-based content

Another feature of the present disclosure is rendering content on a reserved display. Certain types of content, for example video data and context generated by collaborative applications that include screen-sharing, are extremely dynamic and therefore poorly suited to be rendered on a cloud desktop. These applications require content to be re-rendered over the RDP protocol on an endpoint device. This is inefficient as the content must be rendered twice and requires extra bandwidth. This can lead to poor performance. This scenario is illustrated in FIG. 8A, which shows a prior art process for rendering content in a cloud desktop system 800. The prior art system 800 includes a content host 810, a cloud desktop 812, and an endpoint device 814 with a physical display 816. The content host 810 includes a web collaboration server 820 that generates a virtual display 822 with a browser application 824 executed by the cloud desktop 812. The browser application 824 displays content that is rendered via an RDP connection stream on the physical display 816 via the endpoint device 814.

Figure 8B:
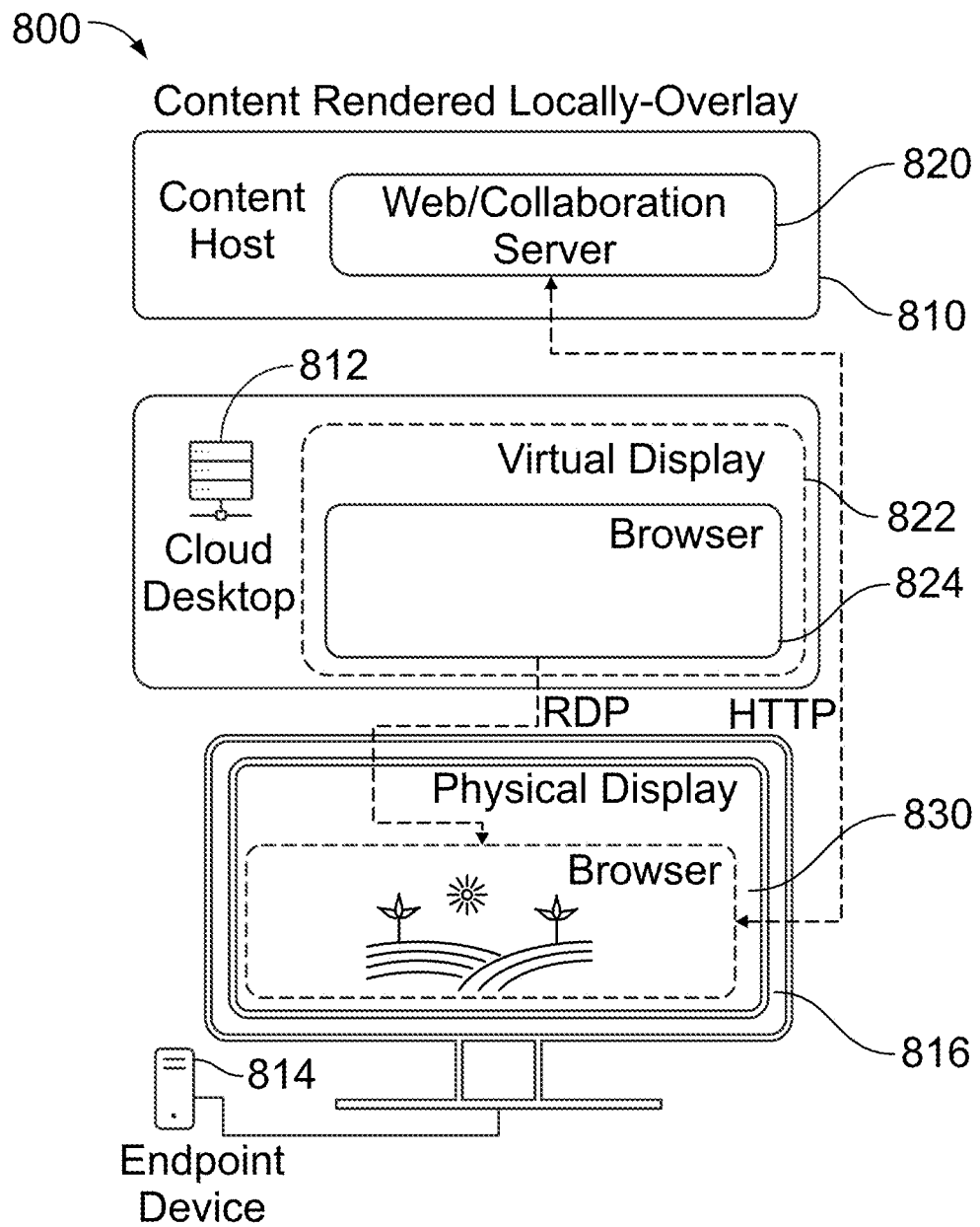
FIG. 8B is another prior art arrangement for display

FIG. 8B shows another process that is run on the system 800 for local display of certain web-based content. When certain content URLs are requested by the web browser application 824 running on the cloud desktop 812, the request may be intercepted and redirected to the endpoint device 814. Client application software running on the endpoint device 814 will send the same request directly to the web or collaboration server 820, and the content is rendered by a browser 830 running locally on the endpoint device 814. Uploaded video and/or screen-sharing content is similarly sent from the endpoint device 814 directly to the web or collaboration server 820. To create the illusion that the content is rendered by the cloud desktop 812, the content may be shown in a special browser window that overlays the area occupied on the virtual display 822 on the actual physical display 816.

Although the known technique of rendering content locally using overlays in FIG. 8B may be an improvement over rendering the content on the cloud desktop, known techniques do not take advantage of having a configured reserved display. For example, the end user may wish to have certain classes of content (such as video or screen-sharing) always appear on the reserved display.

Figures 9A, 9B:
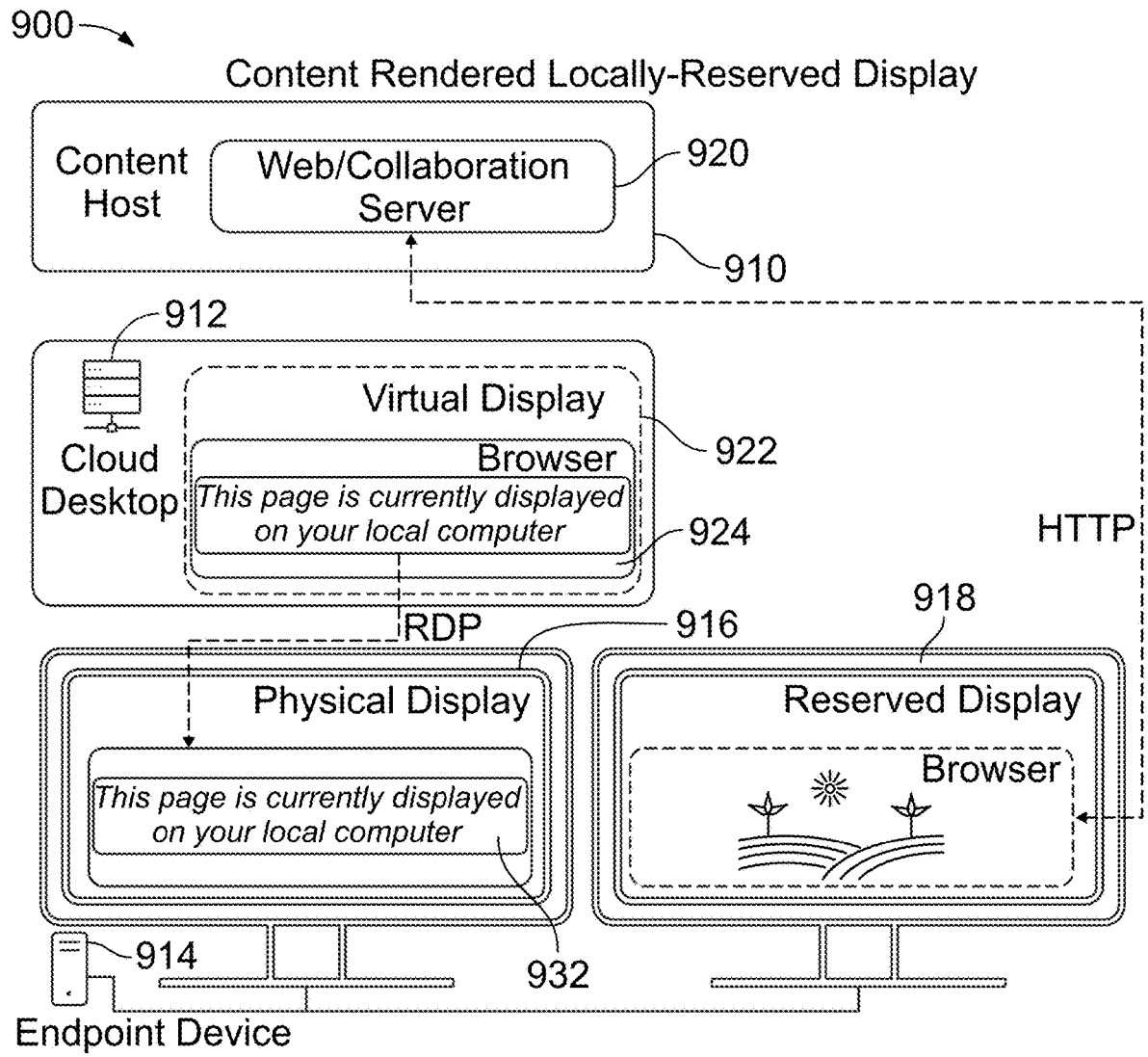
FIG. 9A is an example architecture for use of a reserved display in conjunction with a direct connection to a web server instead of a virtual desktop.
FIG. 9B is an example interface for a user to select content for direct connection of the web server to a reserved display.

Therefore, it is desirable that an end user can specify that some or all multimedia content should always be redirected to the reserved display. This scenario is illustrated by an example setup system 900 in FIG. 9A that includes a content host 910, a cloud desktop 912, and an endpoint device 914 with two physical displays 916 and 918. In this example, one of the displays 918 is a reserved display for local content from the endpoint device 914. The display 918 may be reserved via the process described above using the example interface 570 shown in FIG. 5C. The content host 910 includes a web collaboration server 920. The cloud desktop 912 generates a virtual display 922 with a browser application 924. The browser application 924 displays content that is rendered via RDP protocol on the physical display 916 via the endpoint device 912. The collaboration server 920 generates content from certain applications via a browser 930 executed by the endpoint device 914.

In some implementations, a message 932 appears on the virtual display 922 (and thus is visible on the mapped physical display 916) to inform the user that the content has been redirected to appear on the reserved display 918. In some implementations, the end user can configure what type of content is rendered locally on a reserved display. One way to do this is to create an expression that a URL must match, including wildcards, in order to be rendered locally. There are other ways of doing this including specification of MIME types for content that should be rendered locally. A simple example is illustrated in an example interface 950 in FIG. 9B generated by the cloud desktop 922. The interface 950 includes a dropdown menu 952 that includes selections for reserving a physical display. Another dropdown menu 954 includes a list display 956 that shows URLs to be rendered on the reserved display. The wildcard is designated by a "*" symbol in this example. A link 960 allows a user to add additional URL filters. Once selected, the URL filter is added to the list display 956. In this example, the URLs may include URL selections for local software running on the endpoint device that a user desires to allocate to a reserved physical display. In this example, video conferencing software such as Zoom, Microsoft Teams, Webex, or any application that includes dynamic multi-media content, such as video streaming services.

Another feature of the example system is providing web-based multiple displays for cloud desktops. In order to support multiple displays for an endpoint device with a dedicated client application as opposed to a web-based application, it is possible for the client application software to create a single RDP connection stream that is shared between all displays. One advantage of a shared RDP connection stream is that a standard gateway connection may be used. This simplifies and reduces the cost of the whole solution. Another advantage is that the shared RDP connection stream allows a standard protocol traffic load balancing solution to be used because the connection stream flows over a single connection. Traffic load balancing routines are typically built into standard RDP gateway software. The access to load balancing routines improves performance and reliability of the shared RDP connection stream solution.

Figure 10A:
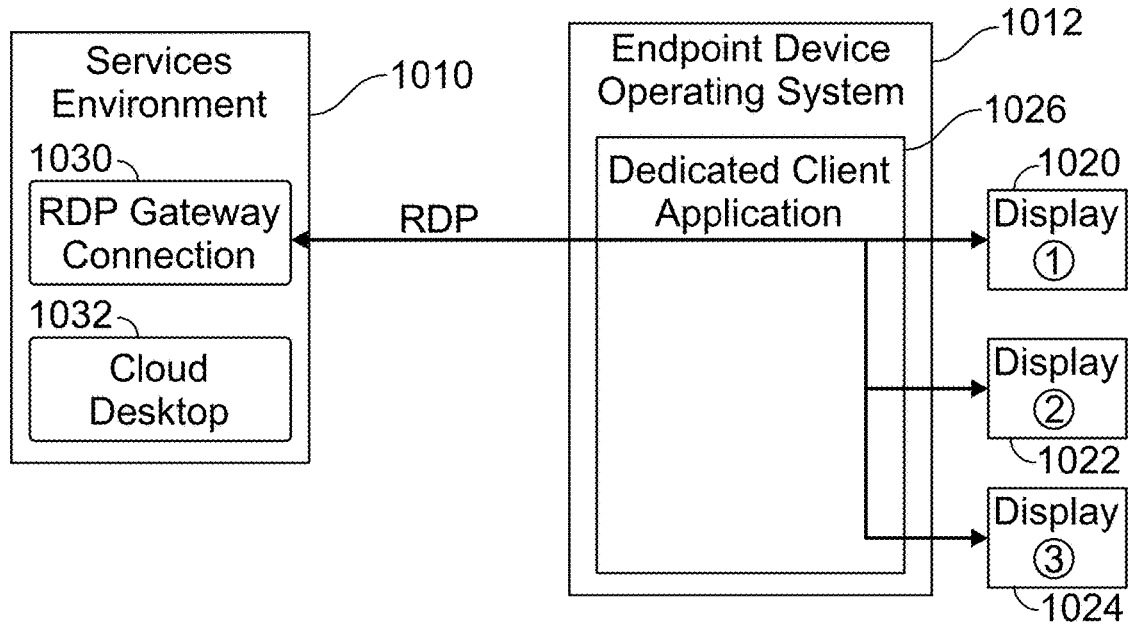
FIG. 10A is a known arrangement for using a shared RDP connection stream for multiple displays using a dedicated standalone client application.

FIG. 10A shows a known web application architecture 1000. The architecture includes a services environment 1010 and an endpoint device operating system 1012 that supports displays 1020, 1022, and 1024. The endpoint device operating system 1012 supports a client application 1026. The services environment 1010 may be the combination of the control plane 150 and regional server 212 in FIG. 2 and typically includes an RDP gateway connection 1030 and a cloud desktop 1032. Direct connections to a cloud desktop 1032 are also possible, although not shown in FIG. 10A. In this example, the client application software 1026 creates a shared RDP connection stream for the displays 1020, 1022, and 1024.

This prior art design for the client application software 1026 to create a shared RDP connection stream in FIG. 10A becomes challenging when the dedicated client application 1026 is replaced by a standard stack of so-called web technologies that are commonly available on endpoint devices. The web application approach has the advantage of providing access to any endpoint device that has standard browser software and networking capabilities already built-in to the device and operating system. The end user can manage and initiate a session with a cloud desktop simply by providing the appropriate URL to a browser application running on the endpoint device.

Figure 10B:
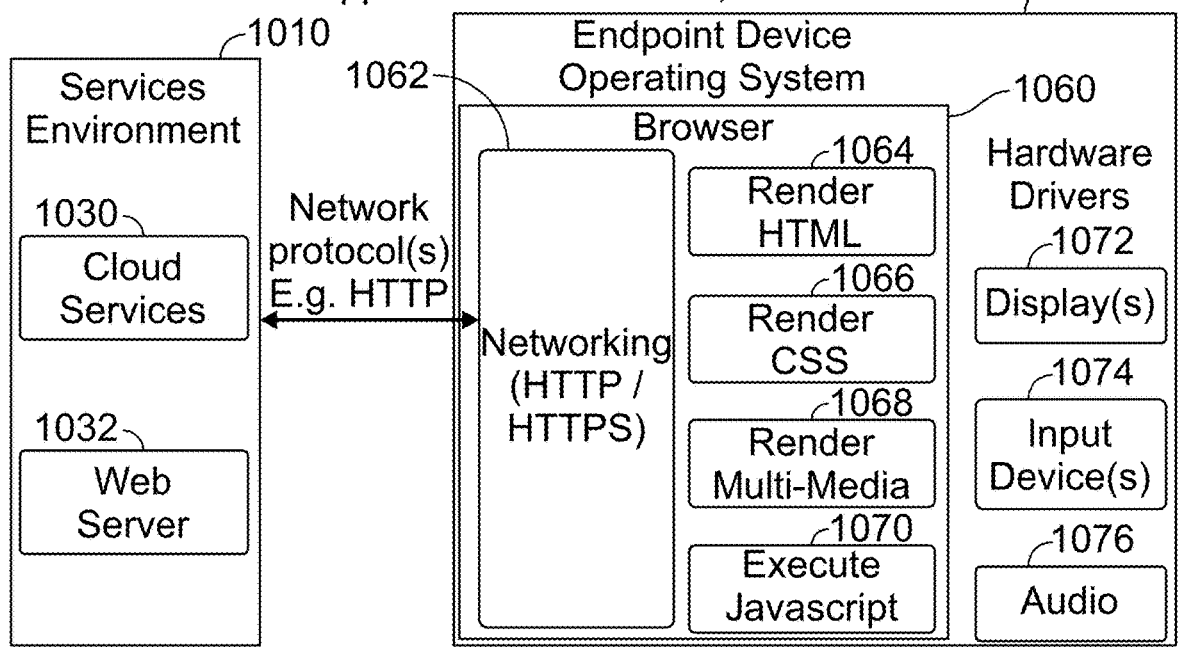
FIG. 10B is a known arrangement for using a shared RDP connection stream for multiple displays using web application technology.

There are many variations of "web application technology" that may be harnessed to provide such access and these are likely to evolve over time. The "web application technology" defines a baseline architecture that is independent of specific libraries and protocols but shares a common underlying architecture. An important aspect of such "web applications" is that they are not downloaded and installed on the endpoint device. Instead, the web applications are made up of a collection of scripts, markup, or smaller executables that are fetched and interpreted as needed by standard browser software. The specific technologies and languages may vary, but some representative components are illustrated in a web application system 1050 shown in FIG. 10B that fetches components FIG. 10B. The web application system 1050 retains the services environment 1010 and an endpoint device operating system 1012 from the system 1000 in FIG. 10A. The operating system 1012 assists in executing shows a browser application 1060 that includes a standard network interface 1062, a Hyper Text Markup Language (HTTP) rendering agent 1064, a Cascading Style Sheets (CSS) rendering agent 1066, a multi-media rendering agent 1068, and a javascript rendering agent 1070. Based on these executable components, the browser application 1060 is capable of interpreting internet-based standard markup languages, exemplified by Hyper Text Markup Language (HTML and HTML5), Cascading Style Sheets (CSS), and JavaScript Object Notation (JSON).

The web browser 1060 (in other words, a general-purpose rendering agent) is executed on the endpoint device. The web browser 1060 is capable of communicating with standard internet-based services using a general-purpose protocol, exemplified by Hyper Text Transport Protocol (HTTP and HTTPS). The ability of the respective rendering agents to execute scripts to implement behaviors bounded by a secure sandbox of operation within the browser's application space and controlled by the operating system 1012 of the endpoint device, exemplified by some flavor of ECMAScript (typically, JavaScript). Notably, the pre-installation of a compiled executable program is not required, even though the web application may optimize its operation by caching certain forms of data and/or executable scripts for performance reasons.

The rendering agents may support other capabilities including plugins, web-sockets, local memory storage and others. The web browser 1060 utilizes the hardware of the endpoint device by using standard operating system interfaces for that purpose. In this example, these interfaces include a display driver 1072, input device drivers 1074 and audio device drivers 1076. A service host provides the web application code itself on demand. Also, a web-based application is typically not pre-installed on the end-point device but rather consists of interpretable code that is downloaded from a service host on demand, that is then interpreted by the browser. Additional services on the internet, including public and private clouds, respond to requests from the browser 1060 using standard protocols as described above, and can provide application-specific business logic, data persistence, and much more. These tend to remain independent of the types of rendering agents (browsers) that are requesting services and may provide the same services to other kinds of client applications that are not web-based.

Figure 10C:
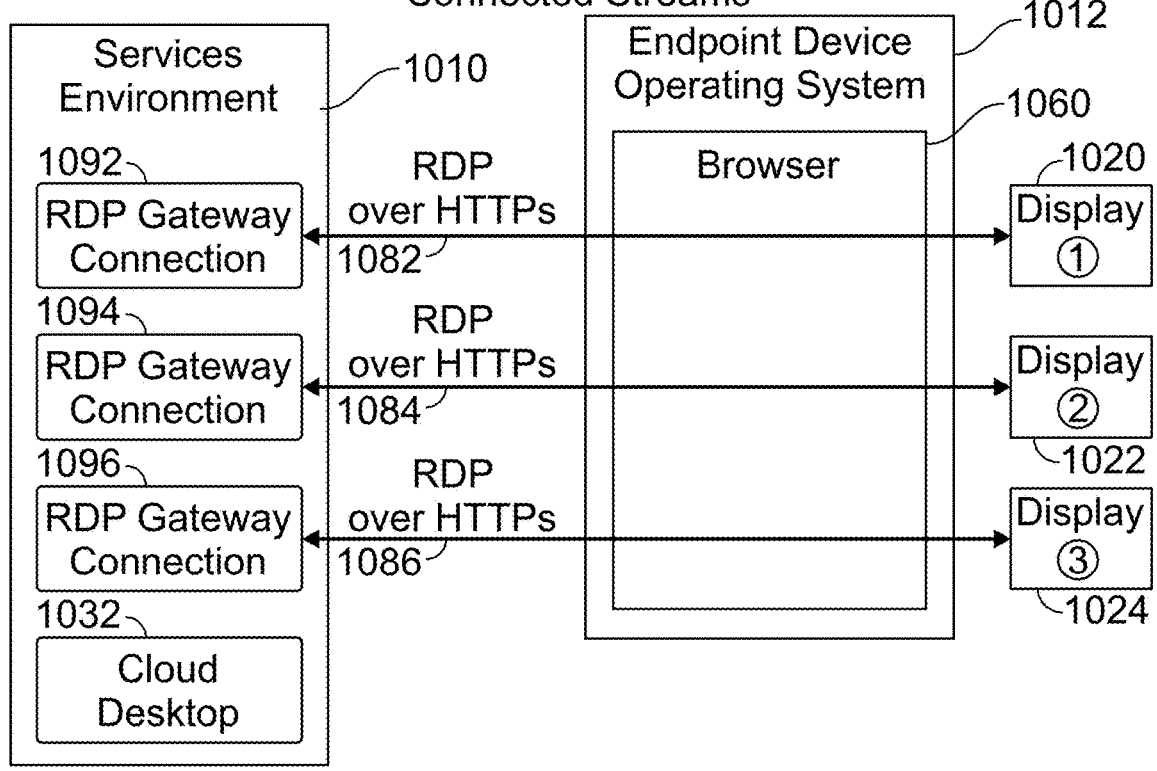
FIG. 10C is a known arrangement for using dedicated RDP connection streams for multiple displays using web application technology.

The client application communicates with the remote display protocol host using a standard cloud desktop protocol (such as RDP) streamed within a standard web network protocol (such as HTTPS). Typically, multi-display access to a cloud desktop using web technology requires that each display be served by its own unique RDP connection stream, as depicted in the following diagram. FIG. 10C shows an architecture that includes another system 1080 that uses the same services environment 1010 and endpoint operating system 1014 to separate unique RDP connection streams 1082, 1084, and 1086 to the respective three monitors 1020, 1022, and 1024.

When supporting multiple virtual displays in a remote display protocol session with a Cloud PC running the cloud desktop 1032, each virtual display is rendered in a separate physical display. The endpoint device operating system 1012 executes the browser application 1060. Each of the separate physical displays 1020, 1022, and 1024 display a Web Browser window in full-screen mode. Therefore, each physical display 1020, 1022, and 1024 effectively has its own Web-based Client. In at least one example of the known system such as the system 1080, each of the physical displays 1020, 1022, and 1024 maintains its own RDP (Remote Display Protocol) stream. Each of the steams 1082, 1084, and 1086 includes a respective gateway connection 1092, 1094 and 1096. Each of the streams 1082, 1084, and 1086 thus has a dedicated connection to the special service running on a gateway host. These streams 1082, 1084, and 1086 are then consolidated to interact with the Cloud desktop 1032.

Figure 11A:
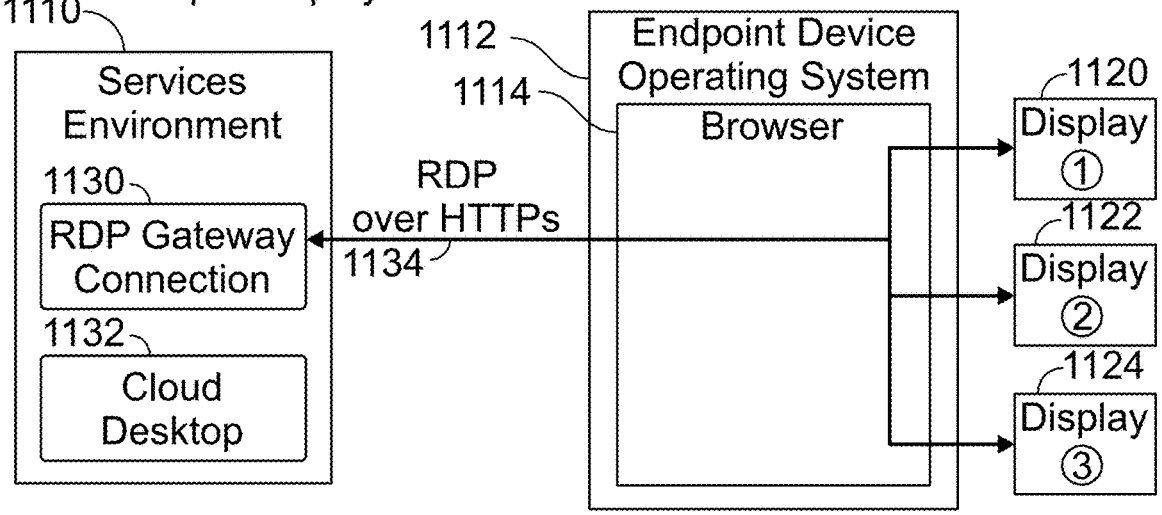
FIG. 11A is a block diagram of the example system using a shared RDP connection stream for multiple displays using web application technology.

The multi-monitor system includes a feature to have one Web-Based Client (on its own physical display) communicate with the other web-based components that are termed extended display processes (each representing their own physical display) within the common web application environment in order to create a single consolidated RDP stream on the endpoint device itself. FIG. 11A shows a multiple display architecture 1100 that includes the services environment 1110 and an endpoint device operating system 1112. The operating system 1112 runs a web browser application 1114. The endpoint device supports three physical displays 1120, 1122, and 1124. The services environment includes an RDP gateway connection 1130 and a cloud desktop 1132.

Figure 11B:
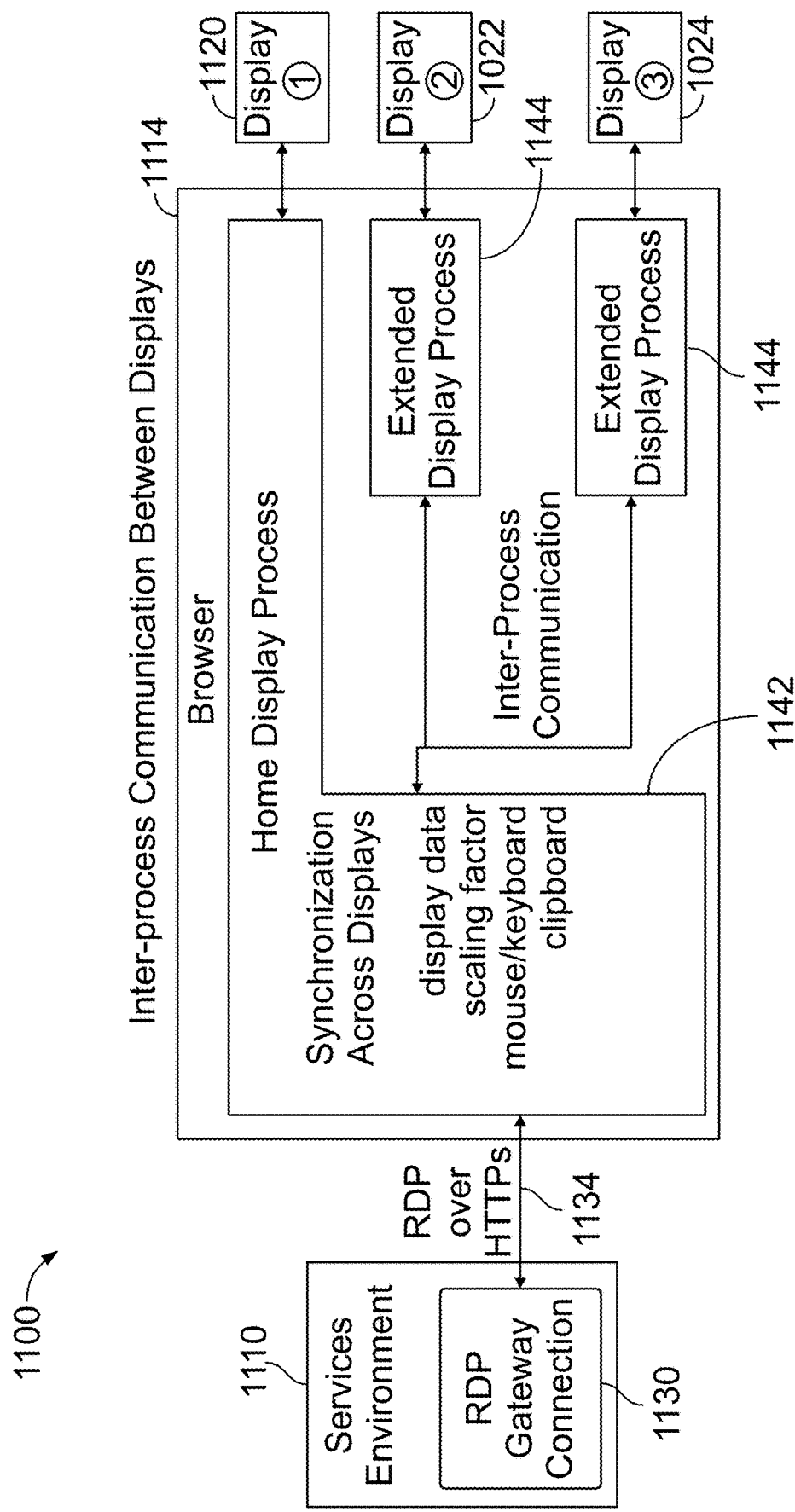
FIG. 11B is a diagram showing the inter-process communication between display processes in the system shown in FIG. 11A.

In order to achieve a single consolidated RDP stream 1134 as shown in FIG. 11B, the web browser application 1114 includes a home display process 1142 and at least one extended display process 1144. The home display process 1142 coordinates data flows related to remote desktop management on behalf of the web application components dedicated to the other displays. The other displays may be termed as "extended display processes" 1144. This implies that there is inter-process communication between the processes 1142 and 1144, with orchestration provided by the "home display process" 1142.

As shown in FIG. 11B, key aspects of the remote displays are mapped are synchronized across physical displays by means of inter-process communication between the display processes 1142 and 1144. The communications include but are not limited to: 1) physical display resolutions and scaling factors to the virtual displays; 2) display of bit-mapped data; 3) mapping mouse and keyboard events; and 4) clipboard events. Mouse and keyboard events for each extended display process is forwarded to the home display process 1142. The home display process 1142 translates the events into a merged coordinate display system. In order to facilitate handling clipboard events such as copy and paste, additional communication between the web-app components are required. For example, in one implementation, when a clipboard copy event occurs within the context of an extended display, there may need to be inter-process communication between the extended display process associated with that extended display, and the home display process 1142, in order to update the contents of the shared clipboard buffer. In a different implementation, the clipboard buffer could be copied among all the display processes whenever a clipboard copy event occurs.

The advantages of a consolidated RDP stream are described above, and through this innovation can be combined with the advantages of a Web Application based solution. Most importantly, because the standard gateway and load-balancing services can be used, this architecture removes one type of component and simplifies the design and ongoing maintenance of the solution.

Figure 12:
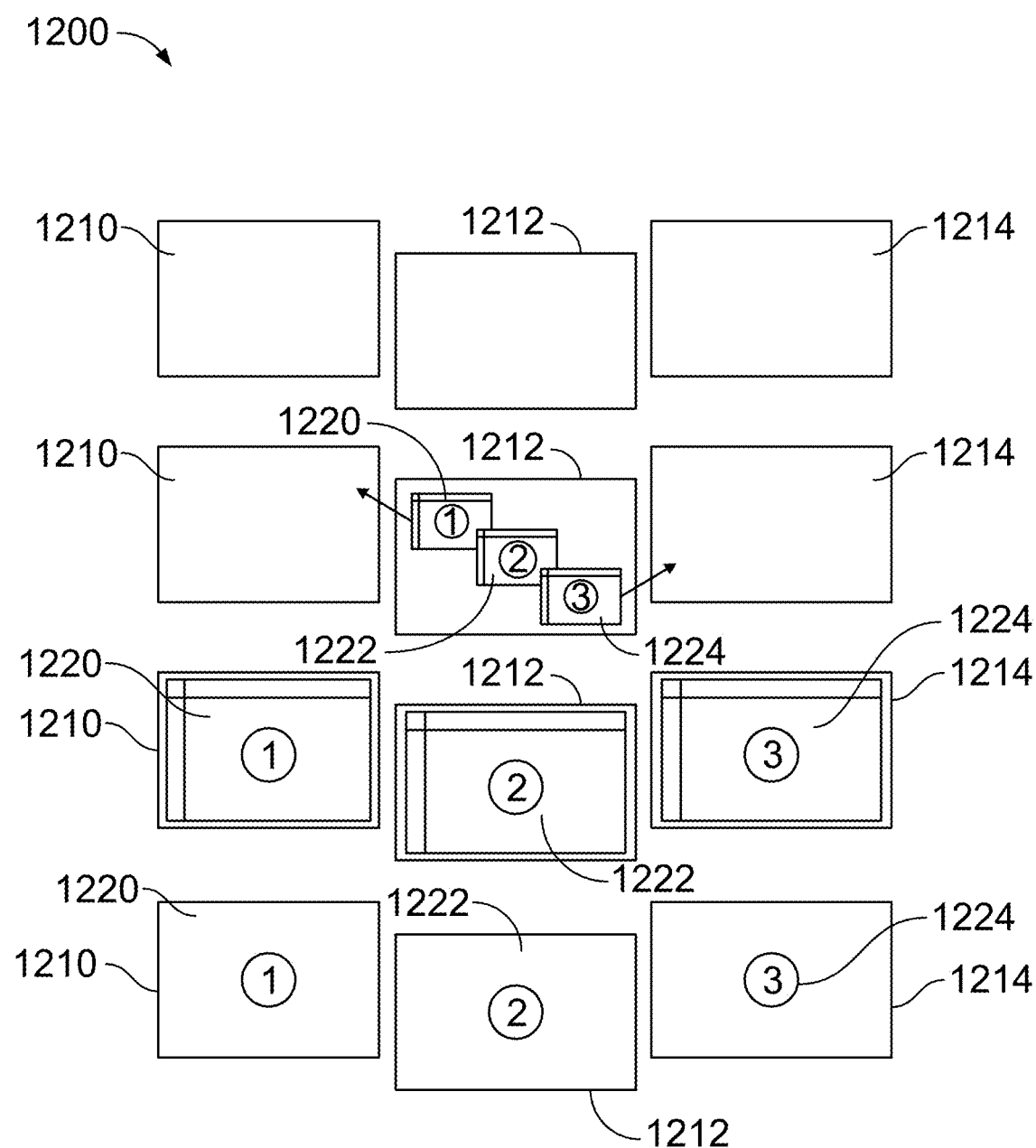
FIG. 12 shows the steps followed by a user for manual arrangement of browser windows in current systems.

Another feature of the multiple display system is allowing automatic setup of virtual displays on physical monitors. Previous web-based RDP solutions do not natively understand the concepts of managing multiple displays. Such solutions typically will map each virtual display to a browser window. Therefore, when using a web application technology to access multiple physical displays of a cloud desktop, the end user must drag and drop the browser windows representing virtual displays to the appropriate physical display as configured in the physical display arrangement. The user must do this manually to maximize the browser windows to give a full screen multi-display experience. FIG. 12 shows the steps required of the user for manual arrangement of browser windows in a current browser based system 1200 that includes three physical displays 1210, 1212, and 1214. After the physical displays are set up, the user may start the cloud desktop. The cloud desktop will map three virtual displays in the form of browser windows 1220, 1222, and 1224 on one of the display 1212. The user must then manually move the browser windows 1220, 1222, and 1224 to the respective physical displays 1210, 1212, and 1214. The user then will expand the browser windows 1220, 1222, and 1224 to fit the area of the respective physical displays 1210, 1212, and 1214.

Figure 13:
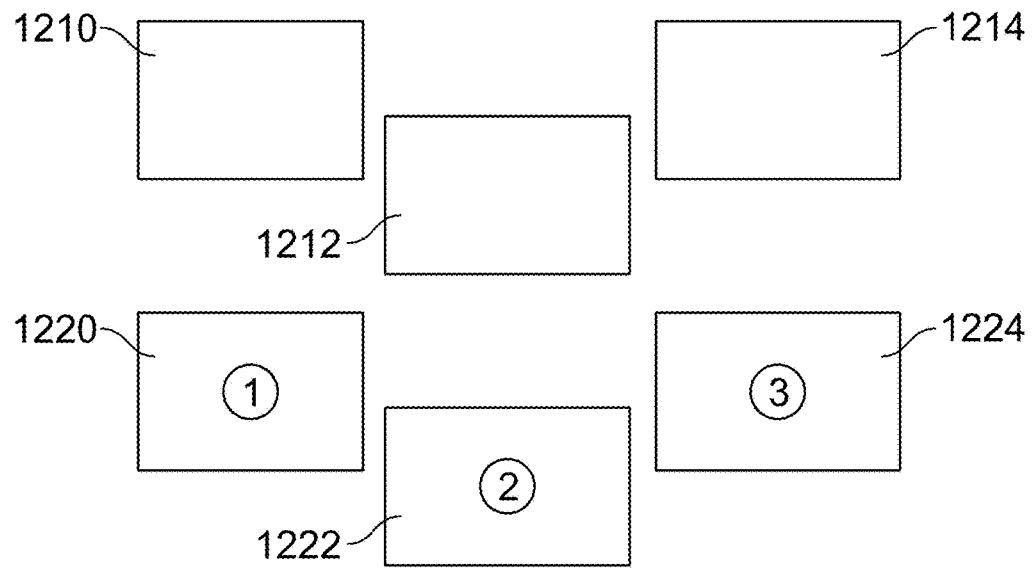
FIG. 13 shows known method of scaling physical displays to match virtual displays of a cloud desktop.

By using configuration information available to the Web-based application running in the browser, it is possible to infer that all virtual displays should automatically appear on the respective physical display in full screen by default. The simplified process for the end user is illustrated in FIG. 13 that shows the process of automatic set up of virtual displays in the system 1200. The monitor arrangement for the physical displays 1210, 1212, and 1214 are previously specified, usually by the end user using the configuration system that is part of the endpoint device operating system. The configuration information is made available to the web-based application running in the browser executed by the endpoint device. The configuration information is used by the web-based client application when the remote session is initiated, so that all the virtual displays 1220, 1222, and 1224 automatically appear in the respective physical displays in full screen.

One advantage of this solution is that it provides enhanced user experience with fewer manual operations required. Furthermore, it ensures that the display of the remote data on the client is consistent with the client monitor configuration.

Furthermore, the example multiple display system constantly observes any configuration change of physical displays that display virtual displays of a cloud desktop. In current systems, if there are changes to the configuration then the user will have an inconsistent and confusing display. The example display system 1200 monitors the local display configuration and can take an action, such as disconnecting or reconfiguring the remote display to match the local monitor configuration. For example, if an additional physical display were added to the endpoint device using "plug and play" capabilities of the endpoint device operating system, and the endpoint device operating system then automatically updated the configuration of the arrangement of displays to some reasonable default, the web-based client application could detect this and cause the cloud desktop operating system to update its arrangement of virtual displays to match the new arrangement of physical displays on the endpoint device. This capability avoids a jarring experience that would otherwise occur for the end user.

Another feature of the example multi-display system is support for native resolution for multiple displays using Web application technology. In current multiple display configurations, the display capabilities of the various displays may not be uniform. For example, one display may be a "4k" resolution (typically 3840×2160 physical pixels) while another may be "1080p" (typically 1920×1080 physical pixels).

When higher physical pixel density displays were introduced such as those with "4k" resolution, users using locally-rendered applications may experience significantly clearer rendering when scaling is in effect, and therefore expected the same level of clarity from remote applications. However, remote applications may be poorly rendered because the Cloud desktop does not send the additional pixels required and therefore text and other graphics are rendered by interpolation on the local display.

For example, a remote application may specify a visual element size as 16×16 virtual pixels, but the client operating system is running with a high-resolution physical display. The user may configure the client operating system to perform 200% scaling in order for the display to appear as intended by the application. In other words, eventually the element must be re-rendered as 32×32 physical pixels.

One method for scaling the virtual display to the physical display can be called the "low resolution method." With this method, the web application-based client requests that the cloud desktop send graphical information using lower-resolution virtual pixel dimensions (such as 1980×1080 virtual pixels). The client does not request scaling and subsequently the web application-based client performs the 200% scaling of the virtual pixels it receives (for example, into 3840×2160 physical pixels). This scaling process leads to some amount of distortion, even though the web application-based client will attempt to minimize it by employing techniques such as anti-aliasing. However, this process is not perfect, especially because the web application-based client does not have any access to the original rendering information, and the example 32×32 physical pixel object may still appear less sharp than if scaling had not occurred.

Another method for scaling the virtual display to the physical display may be termed the "high resolution method." In this method, the web application-based client requests that the remote desktop send graphical information using its full high-resolution physical dimensions (for example, 3840×2160 physical pixels) and requests 200% scaling to be performed by the cloud desktop. In other words, the virtual dimensions and physical dimensions are the same and all the physical pixels are transmitted as part of the display protocol. The cloud desktop virtual display performs the needed 200% scaling as needed, including anti-aliasing, and the result is significantly sharper.

Figure 14:
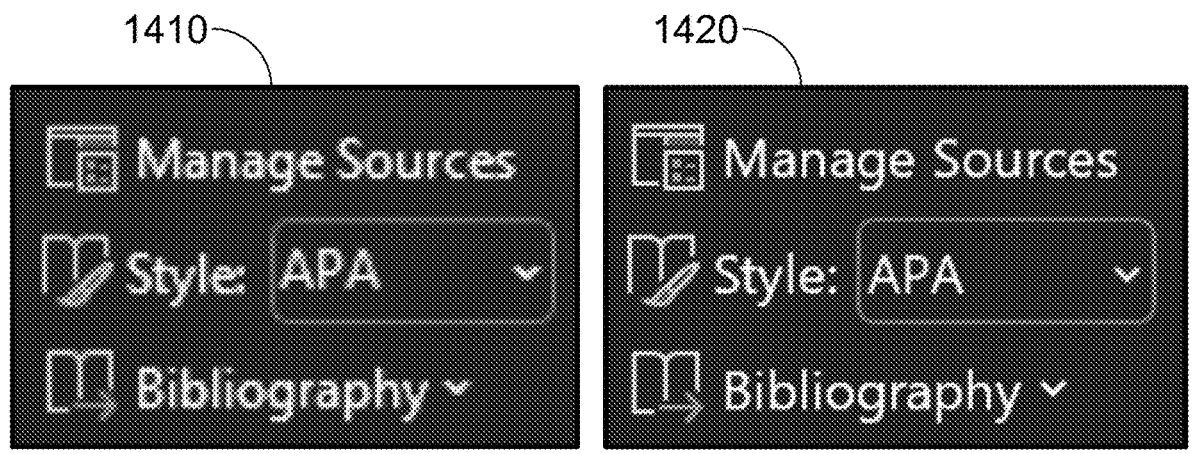
FIG. 14 shows an example of rendering graphics to a lower resolution display in comparison to rendering the graphics to a higher resolution display.

FIG. 14 shows an image 1410 that was scaled using the low-resolution method and the same graphics in an image 1420 scaled using the high resolution method. This illustrates the difference between an image that has been scaled using the low-resolution method and one scaled using the high-resolution method. Both images have been enlarged to demonstrate the difference more clearly. The image 1410 rendered by the "low resolution" method is significantly blurrier than the image 1420 rendered by the "high resolution" method.

Figure 15:
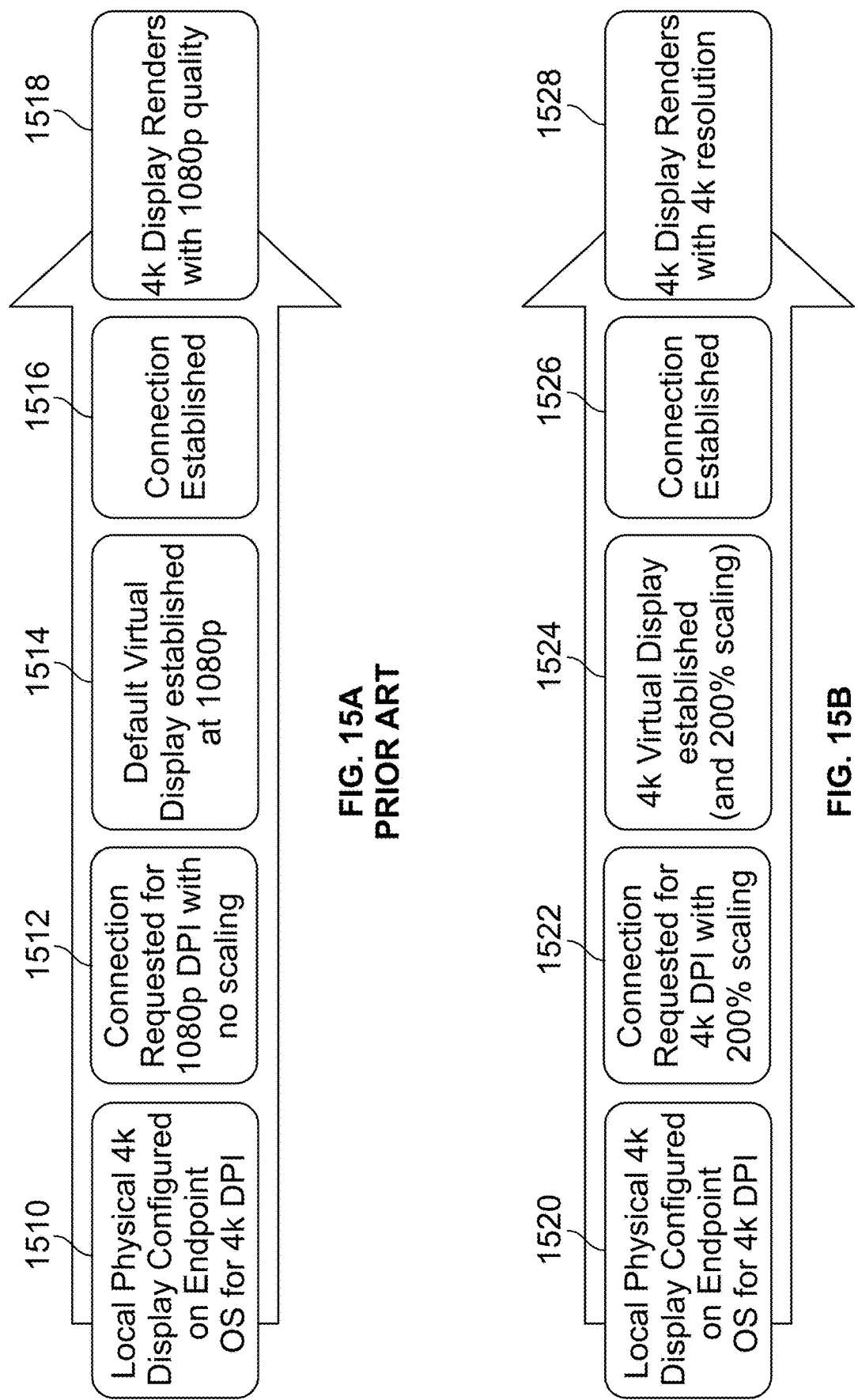
FIG. 15A shows a prior art method of rendering a graphic from a lower resolution application to a higher resolution display.
FIG. 15B shows an example method of providing scaled resolution support for multiple displays in an endpoint device.

FIG. 15A shows a prior art process of rendering graphics on a higher resolution display. The local physical 4k display is configured by the endpoint device operating system for 4k DPI (1510). A connection is requested for 1080p DPI with 100% scaling (1512). The default virtual display is established at 1080p (1514). The connection with the Cloud desktop is established (1516). The endpoint operating system thus renders images from the Cloud desktop application with 1080p resolution on the local physical 4k display (1518). The prior art process thus results in poorly rendered images.

With the example process, the web-based client application, using the remote display protocol, requests the full resolution configured by the endpoint device OS for multiple displays, along with the scaling factor configured by the endpoint device OS for each display individually. The result is that the full density of pixels, scaled according to the specified scaling factor, is sent to the client for rendering by the web-based client application. This enables the local physical device software and hardware to correctly apply the optimizations required to fully take advantage of the higher pixel density display, at the cost of some increased bandwidth.

In prior art examples of multiple displays for web-based client applications, the "low resolution" method is used for all displays. With this innovation, in the case of multiple displays, the web-based client application uses the appropriate process depending on the physical resolution of each display.

FIG. 15B shows the example process for the higher resolution display such as a 4k display. The local physical 4k display is configured by the endpoint device operating system for 4k DPI (1520). A connection is requested for 4K DPI with 200% scaling (1522). A default 4k virtual display is established at 200% scaling (1524). The connection with the Cloud desktop is established (1526). The endpoint operation system thus renders images from the Cloud desktop application at 4k on the local physical 4k display (1528).

Figure 16:
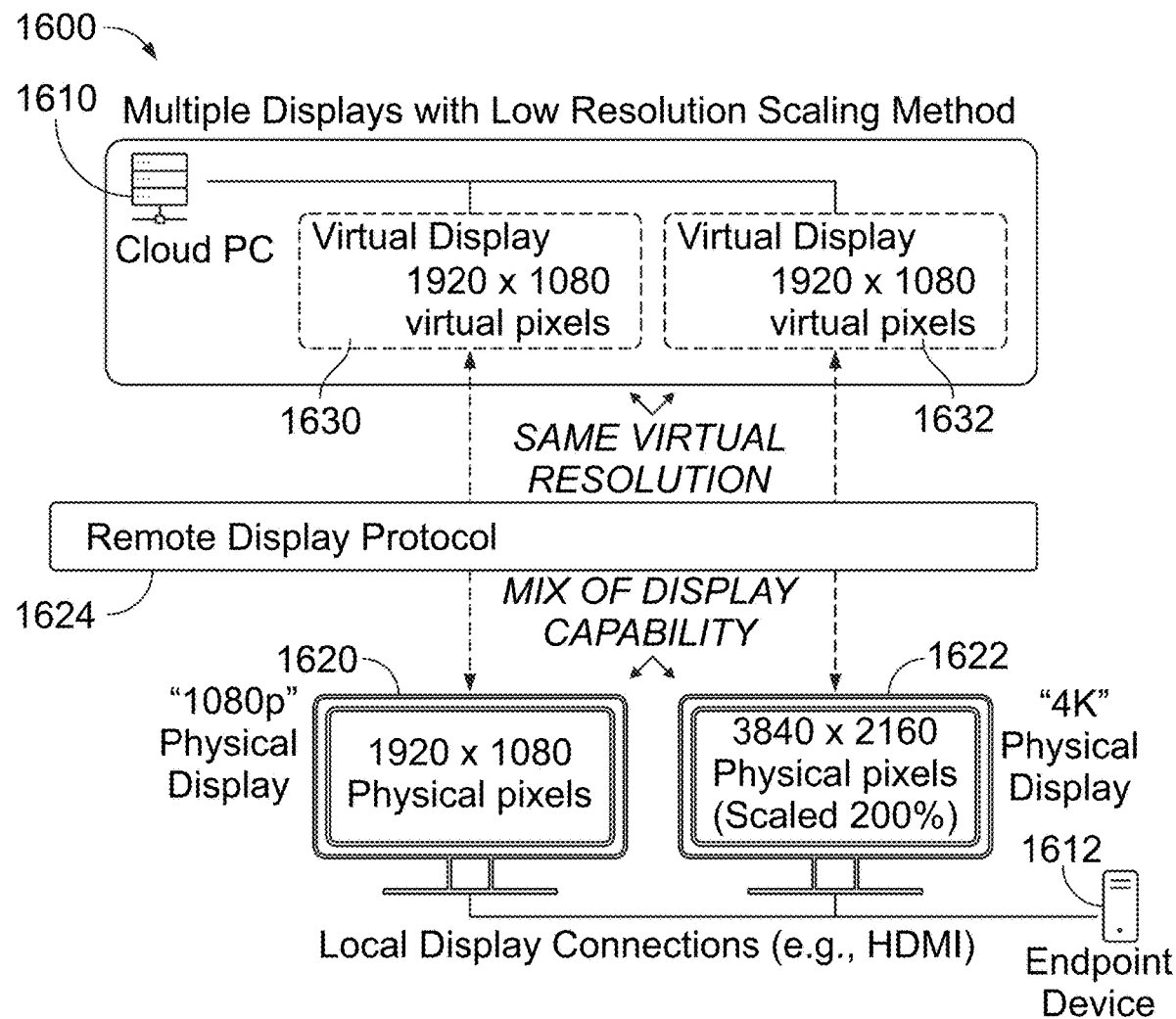
FIG. 16 shows a system that uses the example method of providing scaled resolution support for multiple displays in an endpoint device.

One example of a current system 1600 in shown in FIG. 16. The system 1600 includes a cloud desktop 1610 and an endpoint device 1612 running a client web application. The client web application run by the endpoint device 1612 is connected to two local displays 1620 and 1622 via a video connection such as an HDMI connection. In this scenario, each display 1620 and 1622 has two associated configurations (native resolution and scaled display resolution) based on the capabilities of the physical display device. The "native resolution" of the physical display indicates the number of pixels that are possible to be shown within the area of the display. The "scaled" display resolution is what applications may effectively address while displaying content. An RDP content stream 1624 allows objects to be sized at the scaled resolution, while displaying extra resolution to allow for a sharper display. In this example, the RDP protocol can scale both virtual displays 1630 and 1632 for display on the physical displays 1620 and 1622.

However, when accessing cloud desktop virtual displays such as the virtual displays 1630 and 1632 using web application technologies, the native resolution of the physical displays may not be supported. This causes some of the virtual displays to use a different resolution than the physical display mapped to the respective virtual display. The use of the different resolution can cause a loss of sharpness on that display and fails to take full advantage of the hardware of the display.

In this example, the display 1622 supports 3820×2160 pixel physical resolution (generally referred to as "4k"), while the display 1620 supports a lower quality 1920×1080 pixel physical resolution (generally referred to as "1080p"). The 4k display 1622 will effectively operate as if it were a lower quality 1080p display so the user does not get the full benefit of the higher-quality display. In this example, both virtual displays 1630 and 1632 do not use the high-resolution scaling method for the physical displays 1620 and 1622. Thus, the display 1632 does not take advantage of the native resolution of the physical display 1622.

Typically, web-based client applications that do not use the disclosed techniques must configure a remote session so that all virtual displays use the "low resolution" scaling method. However, the necessary logic within the web-based client application executed by the endpoint device 1612 provides full resolution access to the cloud desktop virtual displays to take advantage of each extended physical display's capability. Specifically, the full scaling must be supported in the web application client program, both for display purposes and for determining the proper location for input events such as mouse movement and mouse clicks.

Figure 17:
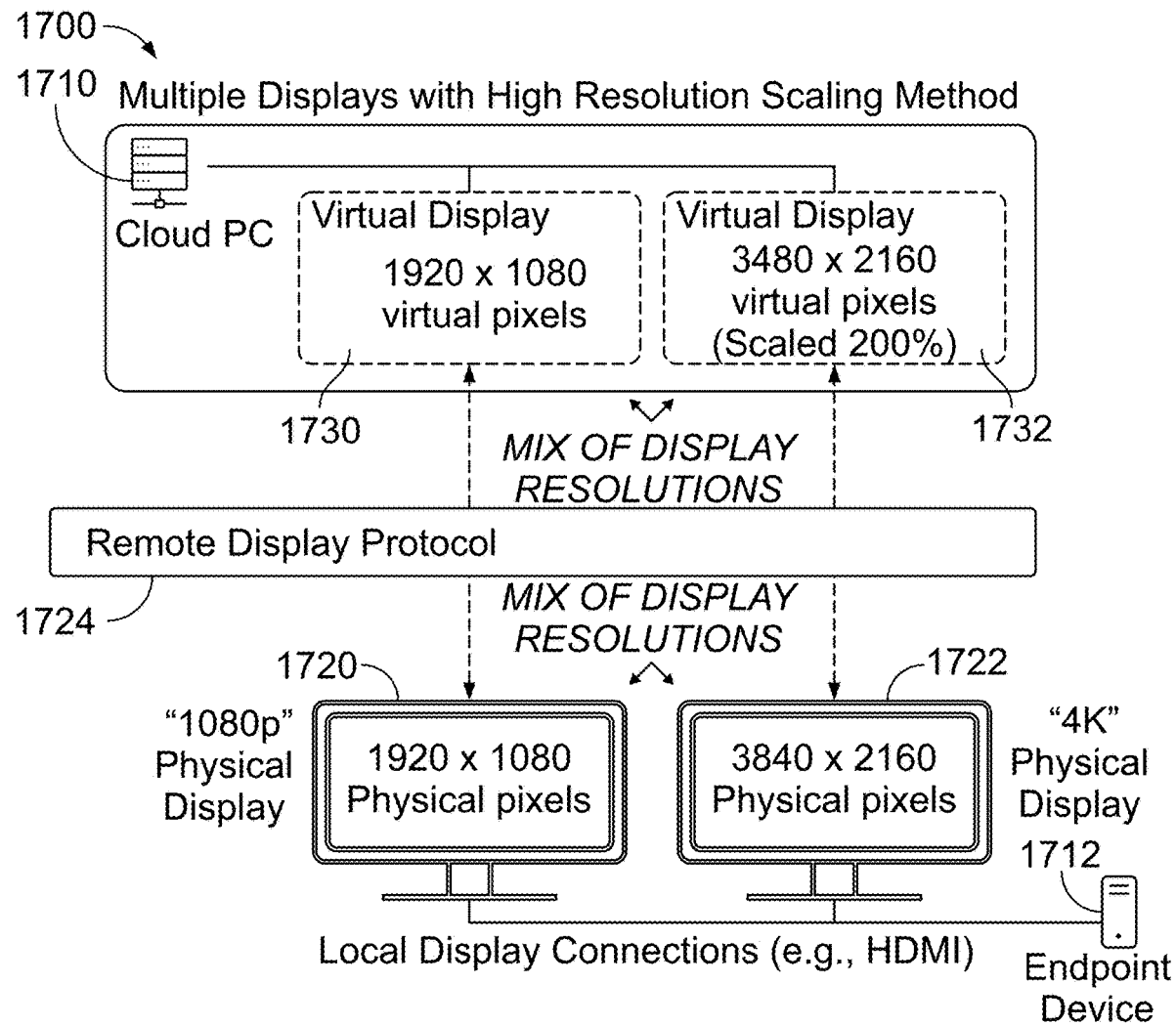
FIG. 17 shows a system that uses the example method of providing native resolution support for multiple displays in an endpoint device.

FIG. 17 shows an example system 1700 that allow matching of proper resolutions for virtual displays mapped to physical displays The system 1700 includes a cloud desktop 1710 and an endpoint device 1712. The endpoint device 1712 is connected to two local displays 1720 and 1722 via a video connection such as an HDMI connection. In this scenario, each display 1720 and 1722 has two associated configurations (native resolution and scaled display resolution) based on the capabilities of the physical display device. In this example, the virtual display 1730 is not required to be scaled because it matches the native resolution of the physical display 1720. However, the virtual display 1732 is scaled at 200% to match the native resolution of the physical display 1720. This means that the video stream is already scaled by the cloud desktop to correctly map into the corresponding physical display, and any graphical events (such as mouse activity) are similarly adjusted before being forwarded to the cloud desktop. Thus, the full capabilities of the "4k display" are now supported by the web-based client application.

Figure 18:
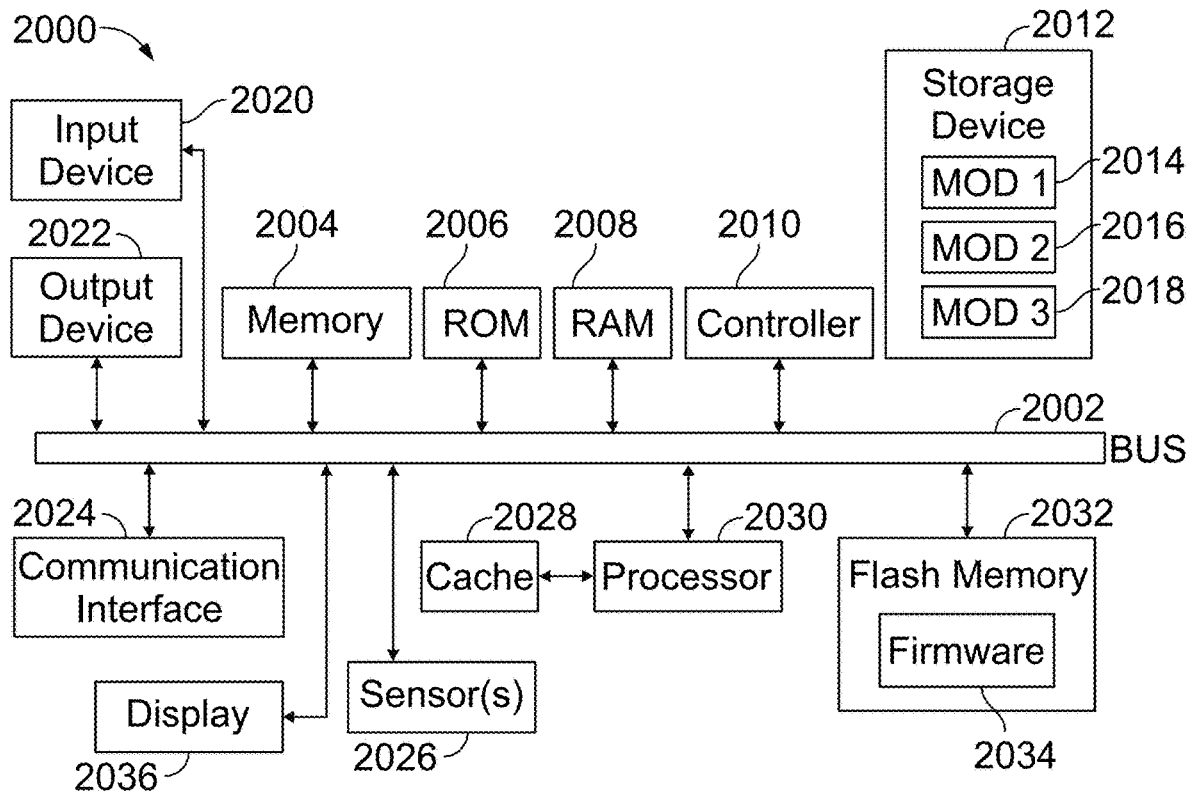
FIGS. 18 and 19 illustrate exemplary systems in accordance with various examples of the present disclosure.
Figure 19:
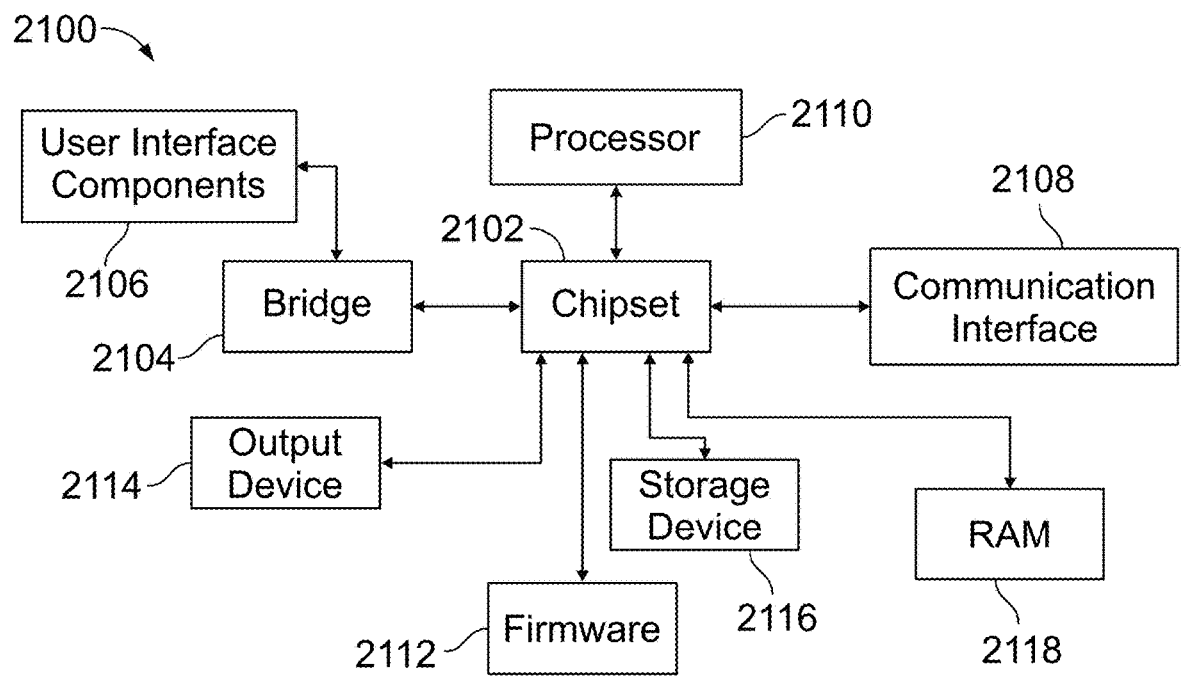

FIGS. 18-19 illustrate an example computing system 2000, in which the components of the computing system are in electrical communication with each other using a bus 2002. The system 2000 includes a processing unit (CPU or processor) 2030 and a system bus 2002 that couple various system components, including the system memory 2004 (e.g., read only memory (ROM) 2006 and random access memory (RAM) 2008), to the processor 2030. The system 2000 can include a cache of high-speed memory connected directly with, in close proximity to, or integrated as part of the processor 2030. The system 2000 can copy data from the memory 2004 and/or the storage device 2012 to the cache 2028 for quick access by the processor 2030. In this way, the cache can provide a performance boost for processor 2030 while waiting for data. These and other modules can control or be configured to control the processor 2030 to perform various actions. Other system memory 2004 may be available for use as well. The memory 2004 can include multiple different types of memory with different performance characteristics. The processor 2030 can include any general purpose processor and a hardware module or software module, such as module 1 2014, module 2 2016, and module 3 2018 embedded in storage device 2012. The hardware module or software module is configured to control the processor 2030, as well as a special-purpose processor where software instructions are incorporated into the actual processor design. The processor 2030 may essentially be a completely self-contained computing system that contains multiple cores or processors, a bus, memory controller, cache, etc. A multi-core processor may be symmetric or asymmetric.

To enable user interaction with the computing device 2000, an input device 2020 is provided as an input mechanism. The input device 2020 can comprise a microphone for speech, a touch-sensitive screen for gesture or graphical input, keyboard, mouse, motion input, and so forth. In some instances, multimodal systems can enable a user to provide multiple types of input to communicate with the system 2000. In this example, an output device 2022 is also provided. The communications interface 2024 can govern and manage the user input and system output.

Storage device 2012 can be a non-volatile memory to store data that is accessible by a computer. The storage device 2012 can be magnetic cassettes, flash memory cards, solid state memory devices, digital versatile disks, cartridges, random access memories (RAMs) 2008, read only memory (ROM) 2006, and hybrids thereof.

The controller 2010 can be a specialized microcontroller or processor on the system 2000, such as a BMC (baseboard management controller). In some cases, the controller 2010 can be part of an Intelligent Platform Management Interface (IPMI). Moreover, in some cases, the controller 2010 can be embedded on a motherboard or main circuit board of the system 2000. The controller 2010 can manage the interface between system management software and platform hardware. The controller 2010 can also communicate with various system devices and components (internal and/or external), such as controllers or peripheral components, as further described below.

The controller 2010 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 2010 to initiate or conduct specific hardware recovery procedures or operations, as further described below.

The controller 2010 can also include a system event log controller and/or storage for managing and maintaining events, alerts, and notifications received by the controller 2010. For example, the controller 2010 or a system event log controller can receive alerts or notifications from one or more devices and components, and maintain the alerts or notifications in a system event log storage component.

Flash memory 2032 can be an electronic non-volatile computer storage medium or chip that can be used by the system 2000 for storage and/or data transfer. The flash memory 2032 can be electrically erased and/or reprogrammed. Flash memory 2032 can include EPROM (erasable programmable read-only memory), EEPROM (electrically erasable programmable read-only memory), ROM, NVRAM, or CMOS (complementary metal-oxide semiconductor), for example. The flash memory 2032 can store the firmware 2034 executed by the system 2000 when the system 2000 is first powered on, along with a set of configurations specified for the firmware 2034. The flash memory 2032 can also store configurations used by the firmware 2034.

The firmware 2034 can include a Basic Input/Output System or equivalents, such as an EFI (Extensible Firmware Interface) or UEFI (Unified Extensible Firmware Interface). The firmware 2034 can be loaded and executed as a sequence program each time the system 2000 is started. The firmware 2034 can recognize, initialize, and test hardware present in the system 2000 based on the set of configurations. The firmware 2034 can perform a self-test, such as a POST (Power-On-Self-Test), on the system 2000. This self-test can test the functionality of various hardware components such as hard disk drives, optical reading devices, cooling devices, memory modules, expansion cards, and the like. The firmware 2034 can address and allocate an area in the memory 2004, ROM 2006, RAM 2008, and/or storage device 2012, to store an operating system (OS). The firmware 2034 can load a boot loader and/or OS, and give control of the system 2000 to the OS.

The firmware 2034 of the system 2000 can include a firmware configuration that defines how the firmware 2034 controls various hardware components in the system 2000. The firmware configuration can determine the order in which the various hardware components in the system 2000 are started. The firmware 2034 can provide an interface, such as an UEFI, that allows a variety of different parameters to be set, which can be different from parameters in a firmware default configuration. For example, a user (e.g., an administrator) can use the firmware 2034 to specify clock and bus speeds, define what peripherals are attached to the system 2000, set monitoring of health (e.g., fan speeds and CPU temperature limits), and/or provide a variety of other parameters that affect overall performance and power usage of the system 2000. While firmware 2034 is illustrated as being stored in the flash memory 2032, one of ordinary skill in the art will readily recognize that the firmware 2034 can be stored in other memory components, such as memory 2004 or ROM 2006.

System 2000 can include one or more sensors 2026. The one or more sensors 2026 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 2026 can communicate with the processor, cache 2028, flash memory 2032, communications interface 2024, memory 2004, ROM 2006, RAM 2008, controller 2010, and storage device 2012, via the bus 2002, for example. The one or more sensors 2026 can also communicate with other components in the system via one or more different means, such as inter-integrated circuit (I2C), general purpose output (GPO), and the like.

Different types of sensors (e.g., sensors 2026) on the system 2000 can also report to the controller 2010 on parameters, such as cooling fan speeds, power status, operating system (OS) status, hardware status, and so forth. A display 2036 may be used by the system 2000 to provide graphics related to the applications that are executed by the controller 2010.

FIG. 19 illustrates an example computer system 2100 having a chipset architecture that can be used in executing the described method(s) or operations, and generating and displaying a graphical user interface (GUI). Computer system 2100 can include computer hardware, software, and firmware that can be used to implement the disclosed technology. System 2100 can include a processor 2110, representative of a variety of physically and/or logically distinct resources capable of executing software, firmware, and hardware configured to perform identified computations. Processor 2110 can communicate with a chipset 2102 that can control input to and output from processor 2110. In this example, chipset 2102 outputs information to output device 2114, such as a display, and can read and write information to storage device 2116. The storage device 2116 can include magnetic media, and solid state media, for example. Chipset 2102 can also read data from and write data to RAM 2118. A bridge 2104 for interfacing with a variety of user interface components 2106, can be provided for interfacing with chipset 2102. User interface components 2106 can include a keyboard, a microphone, touch detection, and processing circuitry, and a pointing device, such as a mouse.

Chipset 2102 can also interface with one or more communication interfaces 2108 that can have different physical interfaces. Such communication interfaces can include interfaces for wired and wireless local area networks, for broadband wireless networks, and for personal area networks. Further, the machine can receive inputs from a user via user interface components 2106, and execute appropriate functions, such as browsing functions by interpreting these inputs using processor 2110.

Moreover, chipset 2102 can also communicate with firmware 2112, which can be executed by the computer system 2100 when powering on. The firmware 2112 can recognize, initialize, and test hardware present in the computer system 2100 based on a set of firmware configurations. The firmware 2112 can perform a self-test, such as a POST, on the system 2100. The self-test can test the functionality of the various hardware components 2102-2118. The firmware 2112 can address and allocate an area in the memory 2118 to store an OS. The firmware 2112 can load a boot loader and/or OS, and give control of the system 2100 to the OS. In some cases, the firmware 2112 can communicate with the hardware components 2102-2110 and 2114-2118. Here, the firmware 2112 can communicate with the hardware components 2102-2110 and 2114-2118 through the chipset 2102, and/or through one or more other components. In some cases, the firmware 2112 can communicate directly with the hardware components 2102-2110 and 2114-2118.

It can be appreciated that example systems 2000 (in FIGS. 18) and 2100 can have more than one processor (e.g., 2030, 2110), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A virtual desktop system comprising:
    a host;
    a virtual desktop executed on the host;
    an endpoint device in network communication with the host via a client application; and
    a plurality of physical monitors coupled to the endpoint device, wherein the client application displays a virtual display of the virtual desktop on one of the plurality of physical monitors and reserves one of the plurality of physical monitors as a reserve monitor for display of content of an application executed on the endpoint device based on a semantic hint, wherein the semantic hint is derived from an input to an interface displayed by the client application on one of the physical monitors.

2. The system of claim 1, wherein the semantic hint includes a description of the relative positions of the plurality of monitors.

3. The system of claim 1, wherein the semantic hint applies a virtual coordinate system to the plurality of monitors to display the virtual display.

4. The system of claim 1, wherein when the physical monitor reserved as the reserve monitor is disconnected, the client application applies the semantic hint to select another of the plurality of monitors as the reserve monitor.

5. The system of claim 1, further comprising a reserve monitor selection input to select a type of content to be displayed on the reserve monitor, wherein the type of content is generated via a content host coupled to the network.

6. The system of claim 5, wherein a content specification of the content is communicated from the host to the endpoint device via a remote display protocol (RDP) connection stream on the network.

7. The system of claim 5, wherein the content is defined by a universal resource locator (URL).

8. A method for supporting multiple monitors for a virtual desktop, the method comprising:
    executing a virtual desktop with a virtual display on a host;
    providing network communication between the host and an endpoint device via a client application; and
    displaying the virtual display of the virtual desktop on one of a plurality of physical monitors coupled to the endpoint device via a client application executed by the endpoint device; and
    reserving one of the plurality of physical monitors as a reserve monitor for display of content of an application executed on the endpoint device based on a semantic hint, wherein the semantic hint is derived from an input to an interface displayed by the client application on one of the physical monitors.

9. The method of claim 8, wherein the semantic hint includes a description of the relative positions of the plurality of monitors.

10. The method of claim 8, wherein the semantic hint applies a virtual coordinate system to the plurality of monitors to display the virtual display.

11. The method of claim 8, further comprising applying the semantic hint to select another of the plurality of monitors as the reserve monitor via the application when the physical monitor reserved as the reserve monitor is disconnected.

12. The method of claim 8, further comprising generating an input to select a type of content via the client application via a content host coupled to the network to be displayed on the reserve monitor.

13. The method of claim 12, wherein a content specification of the content is communicated from the host to the endpoint device via a remote display protocol (RDP) connection stream on the network.

14. The method of claim 12, wherein the content is defined by a universal resource locator (URL).

15. A non-transitory computer-readable medium having machine-readable instructions stored thereon, which when executed by a processor of an endpoint device, cause the processor to:
    provide network communication between a host and the endpoint device, wherein the host executes a virtual desktop with a virtual display;
    display the virtual display of the virtual desktop on one of a plurality of physical monitors coupled to the endpoint device;
    display an interface on one of the physical monitors that includes an input for a semantic hint; and reserve one of the plurality of physical monitors as a reserve monitor for display of content of an application executed on the endpoint device based on the semantic hint.

16. The non-transitory computer-readable medium of claim 15, wherein: the semantic hint includes at least one of a description of the relative positions of the plurality of monitors; a virtual coordinate system to the plurality of monitors to display the virtual display; and a selection of another of the plurality of monitors as the reserve monitor when the physical monitor reserved as the reserve monitor is disconnected.

17. The non-transitory computer-readable medium of claim 15, wherein the instructions cause the processor to generate an input to select a type of content via a content host coupled to the network to be displayed on the reserve monitor.

* * * * *